US012705323B2

(12) United States Patent
He

(10) Patent No.: US 12,705,323 B2
(45) Date of Patent: Aug. 11, 2026

(54) CROSS-DEVICE AUTHENTICATION METHOD AND APPARATUS

(71) Applicant: Huawei Technologies Co., Ltd., Shenzhen (CN)

(72) Inventor: Feng He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 18/687,140

(22) PCT Filed: Aug. 9, 2022

(86) PCT No.: PCT/CN2022/111027

§ 371 (c)(1),
(2) Date: Feb. 27, 2024

(87) PCT Pub. No.: WO2023/024887

PCT Pub. Date: Mar. 2, 2023

(65) Prior Publication Data

US 2024/0370537 A1 Nov. 7, 2024

(30) Foreign Application Priority Data

Aug. 27, 2021 (CN) ......................... 202110996556.0

(51) Int. Cl.
*G06F 21/31* (2013.01)
*H04L 9/32* (2006.01)
*H04L 9/40* (2022.01)

(52) U.S. Cl.
CPC ............ *G06F 21/31* (2013.01); *H04L 9/3234* (2013.01); *H04L 63/0815* (2013.01)

(58) Field of Classification Search
None
See application file for complete search history.

(56) References Cited

U.S. PATENT DOCUMENTS 9,787,654 B2 * 10/2017 Vincent .................. G06Q 20/40
9,979,719 B2 5/2018 Oberheide et al.
(Continued)

FOREIGN PATENT DOCUMENTS

CN 104158883 A 11/2014
CN 105072079 A 11/2015
(Continued)

*Primary Examiner* — James R Turchen
(74) *Attorney, Agent, or Firm* — Conley Rose, P.C.

(57) ABSTRACT

A cross-device authentication method includes: a login authentication initiation device that determines, from at least one electronic device, a login authentication device of a to-be-authenticated application, where an authentication application is installed on the login authentication device, and the authentication application is logged in; and sends a first login authentication request to the login authentication device; the login authentication device displays an account login interface of the authentication application based on the first login authentication request, where the account login interface includes a first button indicating to approve authorization and a second button indicating to reject authorization; obtains an operation instruction when a user performs a tapping operation on a first button or a second button; and feeds back a first login authentication response to the login authentication initiation device.

20 Claims, 16 Drawing Sheets

(56) References Cited

U.S. PATENT DOCUMENTS

| | | | | |
|---|---|---|---|---|
| 2016/0080361 | A1* | 3/2016 | Sondhi | H04L 63/10 726/8 |
| 2017/0118025 | A1* | 4/2017 | Shastri | H04L 9/3234 |
| 2018/0041479 | A1* | 2/2018 | Wang | H04L 63/0838 |
| 2019/0297075 | A1* | 9/2019 | Kaladgi | G06F 21/34 |
| 2020/0067901 | A1 | 2/2020 | Marchand et al. | |
| 2020/0067922 | A1* | 2/2020 | Avetisov | H04L 63/0823 |
| 2021/0044976 | A1* | 2/2021 | Avetisov | H04W 12/08 |
| 2021/0258308 | A1* | 8/2021 | Avetisov | H04L 9/0825 |
| 2023/0284015 | A1* | 9/2023 | Bakshi | H04L 63/18 726/7 |

FOREIGN PATENT DOCUMENTS

| | | | |
|---|---|---|---|
| CN | 105306210 | A | 2/2016 |
| CN | 107196893 | A | 9/2017 |
| CN | 111756696 | A | 10/2020 |
| CN | 113196236 | A | 7/2021 |

* cited by examiner

CROSS-DEVICE AUTHENTICATION METHOD AND APPARATUS

CROSS-REFERENCE TO RELATED APPLICATIONS

This is a U.S. National Stage of International Patent Application No. PCT/CN2022/111027 filed on Aug. 9, 2022, which claims priority to Chinese Patent Application No. 202110996556.0 filed on Aug. 27, 2021, both of which are incorporated by reference.

TECHNICAL FIELD

Embodiments of this application relate to the terminal field, and in particular, to a cross-device authentication method and an apparatus.

BACKGROUND

Currently, many account applications provide an open login authentication platform, for example, a WeChat login authentication platform. When a user taps and uses some applications that require account authentication login, the applications can access the login authentication platform and use an account authentication capability of the access login authentication platform to complete account authentication.

However, in the foregoing authentication process, the user is required to install, on a same electronic device, an application that provides the login authentication platform and a to-be-authenticated application, and the application that provides the login authentication platform needs to be in a logged-in state. If these conditions are not met, an authentication process is very complicated or even authentication cannot be completed. Consequently, user experience is affected.

SUMMARY

This application provides a cross-device authentication method and an apparatus, so as to avoid a complex process of installing and logging in to an authentication application on a login authentication initiation device, thereby ensuring data security of a user.

According to a first aspect, an embodiment of this application provides a cross-device authentication method, applied to a system including a login authentication initiation device and at least one electronic device, where there is a trust relationship between the login authentication initiation device and the at least one electronic device. The method includes: The login authentication initiation device determines, from the at least one electronic device, a login authentication device of a to-be-authenticated application, where an authentication application is installed on the login authentication device, and the authentication application is logged in: the login authentication initiation device sends a first login authentication request to the login authentication device, where the first login authentication request includes identification information of the authentication application and account login indication information: the login authentication device displays an account login interface of the authentication application based on the first login authentication request, where the account login interface includes a first button indicating to approve authorization and a second button indicating to reject authorization; the login authentication device obtains an operation instruction generated when a user performs a tapping operation on the first button or the second button, where the operation instruction includes a login authentication result, and the login authentication device feeds back a first login authentication response to the login authentication initiation device, where the first login authentication response includes indication information of the login authentication result.

This embodiment of this application is based on an established trusted network. A plurality of electronic devices included in the trusted network have a mutual trust relationship. Therefore, it may be considered that any two electronic devices can perform mutual authentication. The login authentication initiation device may be an electronic device in the trusted network. The login authentication device may be another electronic device in the trusted network.

In this embodiment of this application, the login authentication initiation device initiates a login authentication request to the login authentication device that belongs to a same trusted network, and the user authorizes login on an account login interface of the authentication application installed on the login authentication device. Therefore, the to-be-authenticated application installed on the login authentication initiation device logs in by using the logged-in account of the authentication application. In this way, if the login authentication initiation device does not have the account authorization capability of the authentication application, cross-device login authentication can be quickly implemented. Therefore, a complicated process of installing and logging in to the authentication application on the login authentication initiation device can be avoided, and the user does not need to be forced to install the authentication application on all electronic devices. This ensures data security of the user.

According to the first aspect, that the login authentication initiation device determines, from the at least one electronic device, a login authentication device of a to-be-authenticated application includes: The login authentication initiation device sends a query request to one or more electronic devices in the at least one electronic device, where the query request includes the identification information of the authentication application and the account login indication information: the one or more electronic devices separately determines whether the one or more electronic devices have an account authorization capability of the authentication application; at least one electronic device having the account authorization capability of the authentication application in the one or more electronic devices sends a query response to the login authentication initiation device, where the query response includes a device identifier of the at least one electronic device having the account authorization capability of the authentication application; and the login authentication initiation device determines the login authentication device from the at least one electronic device having the account authorization capability of the authentication application.

According to any one of the first aspect and the implementations of the first aspect, that the login authentication initiation device determines the login authentication device from the at least one electronic device having the account authorization capability of the authentication application includes: When there is one electronic device in the at least one electronic device having the account authorization capability of the authentication application, the login authentication initiation device determines the unique electronic device having the account authorization capability of the authentication application as the login authentication device; when there are a plurality of electronic devices in the at least one electronic device having the account authorization capability of the authentication application, the login authentication initiation device displays the plurality of electronic devices having the account authorization capability of the authentication application on a screen for selection by the user, and determines an electronic device selected by the user as the login authentication device; or when there are a plurality of electronic devices in the at least one electronic device having the account authorization capability of the authentication application, the login authentication initiation device determines all the plurality of electronic devices having the account authorization capability of the authentication application as the login authentication devices.

After determining the authentication application expected by the user and a purpose of requesting login authentication from the authentication application, the login authentication initiation device may send a query request to one or more electronic devices in the trusted network, and add the identification information of the authentication application and the account login indication information to the query request, so that the electronic device that receives the query request performs self-check on whether the electronic device has the account authorization capability of the authentication application.

In this embodiment of this application, the login authentication device and the login authentication initiation device belong to a same trusted network, and the login authentication device has an account authorization capability of the authentication application, and may further meet another set condition. In this way, data security of the user can be ensured.

According to any one of the first aspect and the implementations of the first aspect, the system further includes a login authentication platform that provides a login authentication service of the authentication application. That the login authentication device feeds back a first login authentication response to the login authentication initiation device includes: The login authentication device sends a second login authentication response to the login authentication platform, where the login authentication platform provides the login authentication service of the authentication application; and the login authentication platform sends the first login authentication response to the login authentication initiation device based on the second login authentication response.

According to any one of the first aspect and the implementations of the first aspect, before that the login authentication initiation device determines, from the at least one electronic device, a login authentication device of a to-be-authenticated application, the method further includes: The login authentication initiation device sends a second login authentication request to the login authentication platform, where the second login authentication request includes the identification information of the to-be-authenticated application, and the login authentication platform provides the login authentication service of the authentication application; and the login authentication initiation device receives a third login authentication response sent by the login authentication platform, where the third login authentication response includes the identification information of the authentication application and the account login indication information.

In some embodiments, the login authentication initiation device may directly obtain the identification information of the authentication application and the account login indication information. For example, the to-be-authenticated application is a Jnotes application, and the authentication application is a Huawei account application. The two applications are produced by a same manufacturer. Alternatively, the two applications may both register involved component names with an operating system during installation, or for another reason, the login authentication initiation device may directly obtain the identification information of the authentication application and the account login indication information. This is not specifically limited.

In some embodiments, the login authentication initiation device may directly obtain the identification information of the authentication application, but cannot directly obtain the account login indication information. Therefore, the login authentication initiation device needs to send the second login authentication request to the login authentication platform to notify the login authentication platform of the to-be-authenticated application. In this way, the account login indication information is obtained from the login authentication platform.

According to any one of the first aspect and the implementations of the first aspect, after that the login authentication device feeds back a first login authentication response to the login authentication initiation device, the method further includes: When the indication information of the login authentication result indicates that login authentication succeeds, the login authentication device enters a use interface of the to-be-authenticated application: or when the indication information of the login authentication result indicates that login authentication fails, the login authentication device exits the to-be-authenticated application, or the login authentication device pops up a window indicating that the authentication fails.

According to a second aspect, an embodiment of this application provides a cross-device authentication method, applied to a login authentication initiation device, and including: determining a login authentication device of a to-be-authenticated application, where an authentication application is installed on the login authentication device, and the authentication application is logged in: sending a first login authentication request to the login authentication device, where the first login authentication request includes identification information of the authentication application and account login indication information; and obtaining a first login authentication response from the login authentication device, where the first login authentication response includes indication information of a login authentication result.

In this embodiment of this application, the login authentication initiation device initiates a login authentication request to the login authentication device that belongs to a same trusted network, and the user authorizes login on an account login interface of the authentication application installed on the login authentication device. Therefore, the to-be-authenticated application installed on the login authentication initiation device logs in by using the logged-in account of the authentication application. In this way, if the login authentication initiation device does not have the account authorization capability of the authentication application, cross-device login authentication can be quickly implemented. Therefore, a complicated process of installing and logging in to the authentication application on the login authentication initiation device can be avoided, and the user does not need to be forced to install the authentication application on all electronic devices. This ensures data security of the user.

According to the second aspect, the determining a login authentication device of a to-be-authenticated application includes: obtaining a trusted network, where the trusted network includes at least two electronic devices, there is a trust relationship between the at least two electronic devices, and the at least two electronic devices include the login authentication initiation device; and determining the login authentication device from one or more electronic devices other than the login authentication initiation device in the trusted network.

According to any one of the second aspect and the implementations of the second aspect, the determining the login authentication device from one or more electronic devices other than the login authentication initiation device in the trusted network includes: sending a query request to the one or more electronic devices other than the login authentication initiation device in the trusted network, so that the one or more electronic devices separately determine whether the one or more electronic devices have an account authorization capability of the authentication application, where the query request includes the identification information of the authentication application and the account login indication information: receiving a query response sent by at least one electronic device having the account authorization capability of the authentication application in the one or more electronic devices, where the query response includes a device identifier of the at least one electronic device having the account authorization capability of the authentication application; and determining the login authentication device based on the at least one electronic device having the account authorization capability of the authentication application.

According to any one of the second aspect and the implementations of the second aspect, the determining the login authentication device based on the at least one electronic device having the account authorization capability of the authentication application includes: when there is one electronic device in the at least one electronic device having the account authorization capability of the authentication application, determining the unique electronic device having the account authorization capability of the authentication application as the login authentication device; when there are a plurality of electronic devices in the at least one electronic device having the account authorization capability of the authentication application, displaying the plurality of electronic devices having the account authorization capability of the authentication application on a screen for selection by the user, and determining an electronic device selected by the user as the login authentication device; or when there are a plurality of electronic devices in the at least one electronic device having the account authorization capability of the authentication application, determining all the plurality of electronic devices having the account authorization capability of the authentication application as the login authentication devices.

According to any one of the second aspect and the implementations of the second aspect, the obtaining a first login authentication response from the login authentication device includes: receiving the first login authentication response sent by a login authentication platform, where the first login authentication response is sent by the login authentication platform based on a second login authentication response sent by the login authentication device to the login authentication platform, and the login authentication platform provides a login authentication service of the authentication application.

According to any one of the second aspect and the implementations of the second aspect, before the determining a login authentication device of a to-be-authenticated application, the method further includes: sending a second login authentication request to the login authentication platform where the second login authentication request includes identification information of the to-be-authenticated application, and the login authentication platform provides the login authentication service of the authentication application; and receiving a third login authentication response sent by the login authentication platform, where the third login authentication response includes the identification information of the authentication application and the account login indication information.

According to any one of the second aspect and the implementations of the second aspect, after the obtaining a first login authentication response from the login authentication device, the method further includes: when the indication information of the login authentication result indicates that login authentication succeeds, entering a use interface of the to-be-authenticated application: or when the indication information of the login authentication result indicates that login authentication fails, exiting the to-be-authenticated application, or popping up a window indicating that the authentication fails.

According to a third aspect, an embodiment of this application provides a cross-device authentication method, applied to a login authentication device, including: receiving a first login authentication request sent by a login authentication initiation device, where the first login authentication request includes identification information of an authentication application and account login indication information, and a to-be-authenticated application is installed on the login authentication initiation device: displaying an account login interface of the authentication application based on the first login authentication request, where the account login interface includes a first button indicating to approve authorization and a second button indicating to reject authorization: obtaining an operation instruction generated when a user performs a tapping operation on the first button or the second button, where the operation instruction includes a login authentication result; and feeding back a first login authentication response to the login authentication device, where the first login authentication response includes indication information of the login authentication result.

In this embodiment of this application, the login authentication initiation device initiates a login authentication request to the login authentication device that belongs to a same trusted network, and the user authorizes login on an account login interface of the authentication application installed on the login authentication device. Therefore, the to-be-authenticated application installed on the login authentication initiation device logs in by using the logged-in account of the authentication application. In this way, if the login authentication initiation device does not have the account authorization capability of the authentication application, cross-device login authentication can be quickly implemented. Therefore, a complicated process of installing and logging in to the authentication application on the login authentication initiation device can be avoided, and the user does not need to be forced to install the authentication application on all electronic devices. This ensures data security of the user.

According to the third aspect, before the receiving a first login authentication request sent by a login authentication initiation device, the method further includes: receiving a query request sent by the login authentication initiation device, where the query request includes the identification information of the authentication application and the account login indication information: determining whether the login authentication device has an account authorization capability of the authentication application; and when the login authentication device has the account authorization capability of the authentication application, sending a query response to the login authentication initiation device, where the query response includes a device identifier.

According to any one of the third aspect and the implementations of the third aspect, the feeding back a first login authentication response to the login authentication device includes: sending a second login authentication response to a login authentication platform, so that the login authentication platform sends the first login authentication response to the login authentication initiation device based on the second login authentication response, and the login authentication platform provides a login authentication service of the authentication application.

According to a fourth aspect, an embodiment of this application provides an electronic device, used as a login authentication initiation device, including: a processing module, configured to determine a login authentication device of a to-be-authenticated application, where an authentication application is installed on the login authentication device, and the authentication application is logged in; a sending module, configured to send a first login authentication request to the login authentication device, where the first login authentication request includes identification information of the authentication application and account login indication information; and a receiving module, configured to obtain a first login authentication response from the login authentication device, where the first login authentication response includes indication information of a login authentication result.

According to the fourth aspect, the processing module is specifically configured to obtain a trusted network, the trusted network includes at least two electronic devices, there is a trust relationship between the at least two electronic devices, and the at least two electronic devices include the login authentication initiation device, and determine the login authentication device from one or more electronic devices other than the login authentication initiation device in the trusted network.

According to any one of the fourth aspect and the implementations of the fourth aspect, the sending module is further configured to send a query request to the one or more electronic devices other than the login authentication initiation device in the trusted network, so that the one or more electronic devices separately determine whether the one or more electronic devices have an account authorization capability of the authentication application, where the query request includes the identification information of the authentication application and the account login indication information: the receiving module is further configured to receive a query response sent by at least one electronic device having the account authorization capability of the authentication application in the one or more electronic devices, where the query response includes a device identifier of the at least one electronic device having the account authorization capability of the authentication application; and the processing module is specifically configured to determine the login authentication device based on the at least one electronic device having the account authorization capability of the authentication application.

According to any one of the fourth aspect and the implementations of the fourth aspect, the processing module is specifically configured to: when there is one electronic device in the at least one electronic device having the account authorization capability of the authentication application, determine the unique electronic device having the account authorization capability of the authentication application as the login authentication device: when there are a plurality of electronic devices in the at least one electronic device having the account authorization capability of the authentication application, display the plurality of electronic devices having the account authorization capability of the authentication application on a screen for selection by a user, and determine an electronic device selected by the user as the login authentication device: or when there are a plurality of electronic devices in the at least one electronic device having the account authorization capability of the authentication application, determine all the plurality of electronic devices having the account authorization capability of the authentication application as the login authentication devices.

According to any one of the fourth aspect and the implementations of the fourth aspect, the receiving module is further configured to receive the first login authentication response sent by a login authentication platform, the first login authentication response is sent by the login authentication platform based on a second login authentication response sent by the login authentication device to the login authentication platform and the login authentication platform provides a login authentication service of the authentication application.

According to any one of the fourth aspect or the implementations of the fourth aspect, the sending module is further configured to send a second login authentication request to the login authentication platform, the second login authentication request includes identification information of the to-be-authenticated application, and the login authentication platform provides a login authentication service of the authentication application; and the receiving module is further configured to receive a third login authentication response sent by the login authentication platform, where the third login authentication response includes the identification information of the authentication application and the account login indication information.

According to any one of the fourth aspect or the implementations of the fourth aspect, the processing module is further configured to: when the indication information of the login authentication result indicates that login authentication succeeds, enter a use interface of the to-be-authenticated application, or when the indication information of the login authentication result indicates that login authentication fails, exit the to-be-authenticated application, or pop up a window indicating that the authentication fails.

According to a fifth aspect, an embodiment of this application provides an electronic device, used as a login authentication device, including: a receiving module, configured to receive a first login authentication request sent by a login authentication initiation device, where the first login authentication request includes identification information of an authentication application and account login indication information, and a to-be-authenticated application is installed on the login authentication initiation device; a display module, configured to display an account login interface of the authentication application based on the first login authentication request, where the account login interface includes a first button indicating to approve authorization and a second button indicating to reject authorization; a processing module, configured to obtain an operation instruction generated when a user performs a tapping operation on the first button or the second button, where the operation instruction includes a login authentication result; and a sending module, configured to feed back a first login authentication response to the login authentication device, where the first login authentication response includes indication information of the login authentication result.

According to the fifth aspect, the receiving module is further configured to receive a query request sent by the login authentication initiation device, where the query request includes the identification information of the authentication application and the account login indication information; the processing module is further configured to determine whether the electronic device has an account authorization capability of the authentication application; and the sending module is further configured to: when the electronic device has the account authorization capability of the authentication application, send a query response to the login authentication initiation device, where the query response includes a device identifier.

According to any one of the fifth aspect and the implementations of the fifth aspect, the sending module is further configured to send a second login authentication response to a login authentication platform, so that the login authentication platform sends the first login authentication response to the login authentication initiation device based on the second login authentication response, and the login authentication platform provides a login authentication service of the authentication application.

According to a sixth aspect, an embodiment of this application provides an electronic device, including a processor and a transceiver, and a memory, configured to store one or more programs, where when the one or more programs are executed by the one or more processors, the one or more processors are enabled to implement the method according to any one of the second aspect and the third aspect and the possible implementations of the second aspect and the third aspect.

According to a seventh aspect, an embodiment of this application provides a computer-readable storage medium, including a computer program, where when the computer program runs on a camera, the camera is enabled to perform the method according to any one of the second aspect and the third aspect and the possible implementations of the second aspect and the third aspect.

According to an eighth aspect, an embodiment of this application provides a chip, including one or more interface circuits and one or more processors, where the interface circuit is configured to: receive a signal from a memory of an electronic device, and send the signal to the processor, the signal includes computer instructions stored in the memory, and when the processor executes the computer instructions, the electronic device is enabled to perform the method according to any one of the second aspect and the third aspect and the possible implementations of the second aspect and the third aspect.

DESCRIPTION OF EMBODIMENTS

The following clearly and completely describes the technical solutions in embodiments of this application with reference to accompanying drawings in embodiments of this application. It is clear that the described embodiments are some but not all of embodiments of this application. All other embodiments obtained by a person of ordinary skill in the art based on embodiments of this application without creative efforts shall fall within the protection scope of embodiments of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object and a second target object are intended to distinguish between different target objects, but not to indicate a specific order of the target objects.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. To be precise, the terms such as "example" or "for example" are intended to present a related concept in a specific manner.

In the description of the embodiment of this application, unless otherwise stated, "a plurality of" means two or more than two. For example, a plurality of processing units are two or more processing units, and a plurality of systems are two or more systems.

In the description of embodiments of this application, unless otherwise stated, "a plurality of" means two or more than two. For example, a plurality of processing units are two or more processing units, and a plurality of systems are two or more systems.

Figure 1:
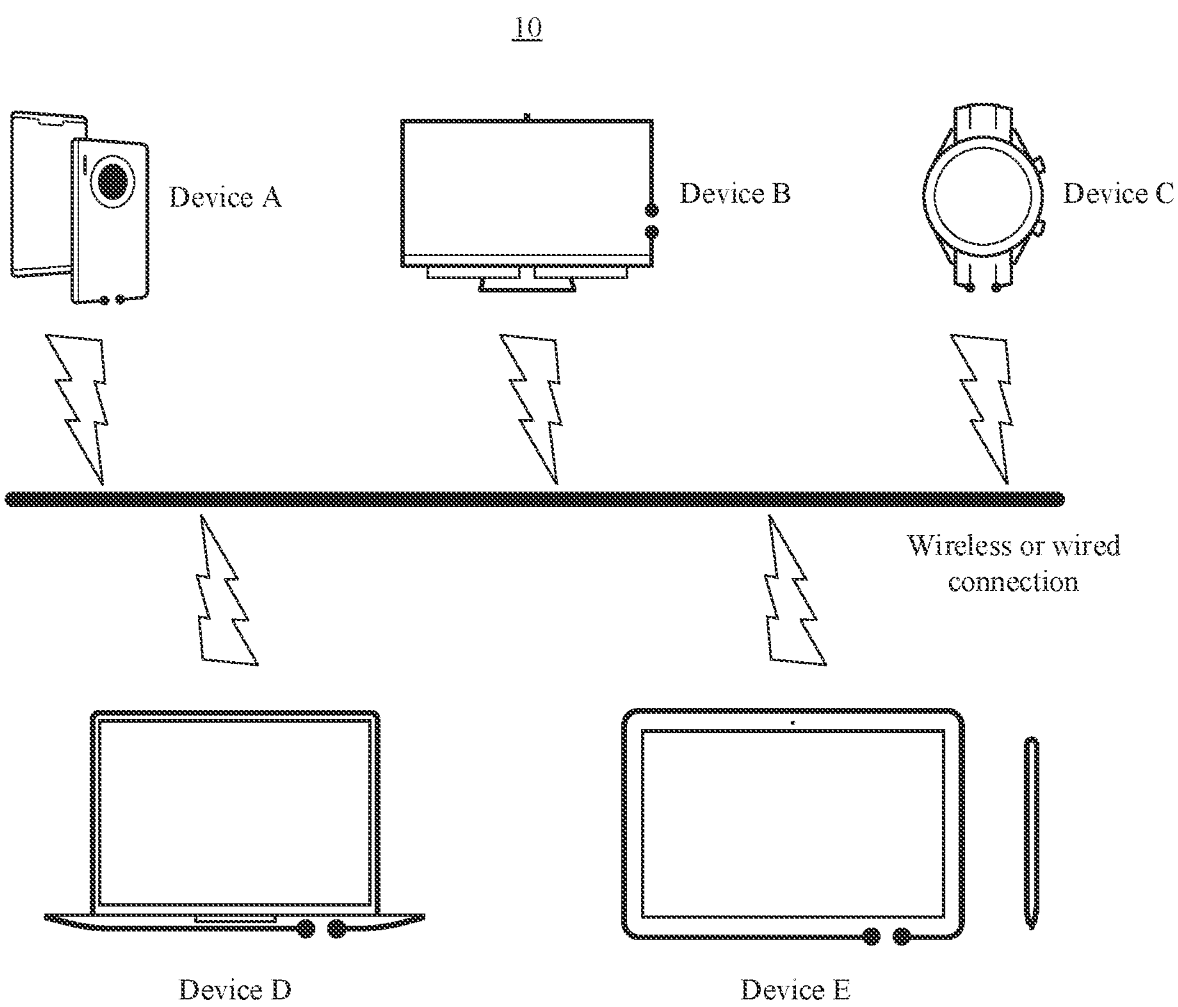
FIG. 1 is an example diagram of a structure of a trusted network 10 according to an embodiment of this application.

Before the technical solutions in embodiments of this application are described, a trusted network in embodiments of this application is first described with reference to the accompanying drawings. FIG. 1 is an example diagram of a structure of a trusted network 10 according to an embodiment of this application. As shown in FIG. 1, the trusted network 10 may include a plurality of electronic devices, for example, a device A, a device B, a device C, a device D, and a device E. For example, the electronic device may include any one or more of electronic devices such as a mobile phone, a tablet, a notebook computer, a smart screen, a wearable device, a vehicle-mounted device, an augmented reality (augmented reality, AR)/virtual reality (virtual reality, VR) device, an ultra-mobile personal computer (ultra-mobile personal computer, UMPC), a netbook, and a personal digital assistant (personal digital assistant, PDA). It should be understood that a quantity and forms of electronic devices included in the trusted network 10 are not limited in this embodiment of this application.

In addition, any two electronic devices in the trusted network 10 may communicate with each other in a plurality of different manners, for example, communication is performed in a connection manner or in a manner of a future communication technology to transmit data. The connection manner may include a plurality of different connection manners such as a wired connection or a wireless connection. In addition, the connection may be a direct connection, or may be an indirect connection. For example, the two electronic devices may be connected by using a USB data cable. The wireless connection between the two electronic devices may be a Wi-Fi connection, a near-field communication connection, a Bluetooth code scanning connection, or the like. The two electronic devices may be connected by using an intermediate node (for example, a switch). Alternatively, the two electronic devices may transmit data in a manner of a future communication technology, for example, by installing different or same applications on a mobile phone and a tablet, by using a 5G communication network. A connection manner or a communication manner between the two electronic devices is not limited in this embodiment of this application.

In this embodiment of this application, a plurality of electronic devices in the trusted network 10 have a mutual trust relationship, and may share all or some application data. It should be noted that data that can be shared between any two electronic devices in the trusted network 10 may be determined based on preset settings, or may be determined based on negotiation between the two electronic devices, or may be determined in another available manner. This is not specifically limited in this embodiment of this application.

A trusted network may be obtained by using any one or more of the following methods:

(1) All electronic devices that use the same account (for example. Huawei account) to log in form the trusted network.

(2) All electronic devices that are scanned by a super terminal (for example, a HarmonyOS super terminal or a user-specified device), and the super terminal form the trusted network.

(3) All electronic devices that establish connections by touching and scanning codes form the trusted network.

(4) All electronic devices in the same local area network form the trusted network.

It should be noted that in addition to the foregoing four methods, a trusted network may be further formed by using another method in this embodiment of this application. This is not specifically limited in this embodiment of this application.

Figure 2:
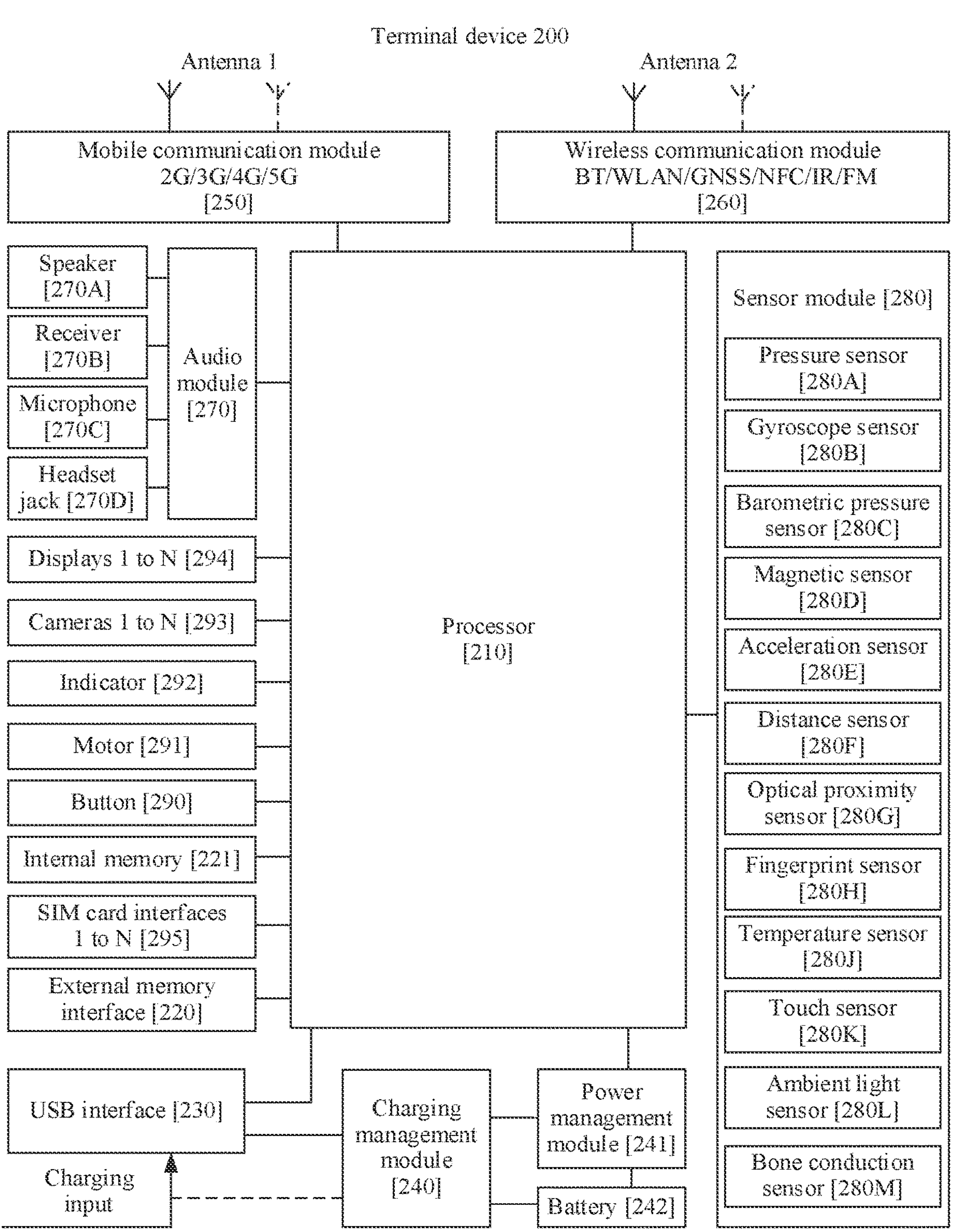
FIG. 2 is an example diagram of a structure of an electronic device 200 according to an embodiment of this application.

FIG. 2 is an example diagram of a structure of an electronic device 200 according to an embodiment of this application. As shown in FIG. 2, the electronic device 200 may be any one of a plurality of electronic devices included in the trusted network 10 shown in FIG. 1.

It should be understood that the electronic device 200 shown in FIG. 2 is merely an example, and the electronic device 200 may have more or fewer components than those shown in FIG. 2, or may combine two or more components, or may have different component configurations. The components shown in FIG. 2 may be implemented in hardware including one or more signal processing and/or application-specific integrated circuits, software, or a combination of hardware and software.

The electronic device 200 may include: a processor 210, an external memory interface 220, an internal memory 121, a universal serial bus (universal serial bus. USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU) Different processing units may be independent components, or may be integrated into one or more processors.

The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 210 may include a plurality of groups of I2C buses. The processor 210 may be separately coupled to the touch sensor 280K, a charger, a flash, the camera 293, and the like by using different I2C bus interfaces. For example, the processor 210 may be coupled to the touch sensor 280K by using the I2C interface, so that the processor 210 communicates with the touch sensor 280K by using the I2C bus interface, to implement a touch function of the electronic device 200.

The I2S interface may be configured to perform audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transmit an audio signal to the wireless communication module 260 through the I2S interface, to implement a function of answering a call through a Bluetooth headset.

The PCM interface may also be used to perform audio communication, and sample, quantize, and code an analog signal. In some embodiments, the audio module 270 may be coupled to the wireless communication module 260 through a PCM bus interface. In some embodiments, the audio module 270 may alternatively transfer an audio signal to the wireless communication module 260 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is generally configured to connect the processor 210 and the wireless communication module 260. For example, the processor 210 communicates with a Bluetooth module in the wireless communication module 260 through the UART interface, to implement a Bluetooth function. In some embodiments, the audio module 270 may transmit an audio signal to the wireless communication module 260 through the UART interface, to implement a function of playing music by using a Bluetooth headset.

The MIPI interface may be configured to connect the processor 210 and a peripheral component such as the display 294 or the camera 293. The MIPI interface includes a camera serial interface (camera serial interface, CSI), a display serial interface (display serial interface, DSI), and the like. In some embodiments, the processor 210 communicates with the camera 293 by using the CSI interface, to implement a photographing function of the electronic device 200. The processor 210 communicates with the display 294 by using the DSI interface, to implement a display function of the electronic device 200.

The GPIO interface may be configured by software. The GPIO interface may be configured as a control signal or a data signal. In some embodiments, the GPIO interface may be configured to connect the processor 210 to the camera 293, the display 294, the wireless communication module 260, the audio module 270, the sensor module 280, or the like. The GPIO interface may alternatively be configured as an I2C interface, an I2S interface, a UART interface, an MIPI interface, or the like.

The USB interface 230 is an interface that conforms to a USB standard specification, and may be specifically a mini USB interface, a micro USB interface, a USB Type-C interface, or the like. The USB interface 230 may be configured to connect to a charger to charge the electronic device 200, or may be configured to perform data transmission between the electronic device 200 and a peripheral device, or may be configured to connect to a headset for playing audio through the headset. The interface may be further configured to connect to another electronic device, for example, an AR device.

It should be understood that an interface connection relationship between modules illustrated in this embodiment of this application is merely an example for description, and does not constitute a limitation on the structure of the electronic device 200. In some other embodiments of this application, the electronic device 200 may alternatively use an interface connection manner different from that in the foregoing embodiment, or use a combination of a plurality of interface connection manners.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the electronic device 200. The charging management module 240 supplies power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 121, an external memory; the display 294, the camera 293, the wireless communication module 260, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device 200 may be configured to cover one or more communication frequency bands. Different antennas may be further multiplexed, to improve antenna utilization.

For example, the antenna 1 may be multiplexed as a diversity antenna of a wireless local area network. In some other embodiments, the antenna may be used in combination with a tuning switch.

The mobile communication module 250 may provide a wireless communication solution that includes 2G/3G/4G/5G or the like and that is applied to the electronic device 200. The mobile communication module 250 may include at least one filter, a switch, a power amplifier, a low noise amplifier (low noise amplifier, LNA), and the like. The mobile communication module 250 may receive an electromagnetic wave through the antenna 1, perform processing, for example, filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some functional modules in the mobile communication module 250 may be disposed in the processor 210. In some embodiments, at least some functional modules in the mobile communication module 250 may be disposed in a same component as the at least some modules in the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the phone receiver 270B, or the like), or displays an image or a video by using the display 294. In some embodiments, the modem processor may be an independent component. In some other embodiments, the modem processor may be independent of the processor 210, and is disposed in a same component as the mobile communication module 250 or another functional module.

The wireless communication module 260 may provide a wireless communication solution applied to the electronic device 200 and including a wireless local area network (wireless local area network, WLAN) (for example, a wireless fidelity (Wireless Fidelity. Wi-Fi) network). Bluetooth (Bluetooth, BT), a global navigation satellite system (global navigation satellite system, GNSS), frequency modulation (frequency modulation, FM), a near field communication (near field communication, NFC) technology; an infrared (infrared, IR) technology, and the like. The wireless communication module 260 may be one or more components integrating at least one communication processing module. The wireless communication module 260 receives an electromagnetic wave by the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, in the electronic device 200, the antenna 1 and the mobile communication module 250 are coupled, and the antenna 2 and the wireless communication module 260 are coupled, so that the electronic device 200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 200 implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 200 may include one or N displays 294, where N is a positive integer greater than 1.

The electronic device 200 may implement a photographing function by using the ISP, the camera 293, the video codec, the GPU, the display 294, the application processor, and the like.

The ISP is configured to process data fed back by the camera 293. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 200 may include one or N cameras 293, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transform on frequency energy and the like.

The video codec is configured to compress or decompress a digital video. The electronic device 200 may support one or more video codecs. In this way, the electronic device 200 can play or record videos in a plurality of coding formats, for example, moving picture experts group (moving picture experts group. MPEG)-1, MPEG-2, MPEG-3, and MPEG-4.

The NPU is a neural-network (neural-network, NN) computing processor With reference to a structure of a biological neural network, for example, with reference to a transfer mode between neurons of a human brain, the NPU quickly processes input information, and can further continuously perform self-learning. The NPU can implement applications such as intelligent cognition of the electronic device 200, such as image recognition, facial recognition, speech recognition, and text understanding.

The external memory interface 220 may be configured to connect to an external storage card, for example, a Micro SD card, to extend a storage capability of the electronic device 200. The external storage card communicates with the processor 210 through the external memory interface 220, to implement a data storage function. For example, files such as music and videos are stored in the external storage card.

The internal memory 121 may be configured to store computer-executable program code. The executable program code includes instructions. The processor 210 runs the instructions stored in the internal memory 121, to perform various function applications of the electronic device 200 and data processing. The internal memory 121 may include a program storage area and a data storage area. The program storage area may store an operating system, an application required by at least one function (for example, a voice playing function or an image playing function), and the like. The data storage region may store data (for example, audio data and a phone book) created when the electronic device 200 is used, and the like. In addition, the internal memory 121 may include a high-speed random access memory, and may further include a nonvolatile memory, for example, at least one magnetic disk storage device, a flash memory, or a universal flash storage (universal flash storage. UFS).

The electronic device 200 can implement an audio function, for example, music playing or recording by using the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to, encode and decode an audio signal.

In some embodiments, the audio module 270 may be disposed in the processor 210, or some functional modules in the audio module 270 are disposed in the processor 210.

The speaker 270A, also referred to as a "horn", is configured to convert an audio electrical signal into a sound signal. The electronic device 200 may listen to music or answer a hands-free call by using the speaker 270A.

The receiver 270B, also referred to as an "earpiece", is configured to convert the audio electrical signal into the sound signal. When a call is answered or voice information is received by using the electronic device 200, the receiver 270B may be put close to a human ear to listen to a voice.

The microphone 270C, also referred to as a "mike" or a "mic", is configured to convert a sound signal into an electrical signal. When making a call or sending a voice message, a user may make a sound near the microphone 270C through the mouth of the user, to input a sound signal to the microphone 270C. At least one microphone 270C may be disposed in the electronic device 200. In some other embodiments, two microphones 270C may be disposed in the electronic device 200, to collect a sound signal and further implement a noise reduction function. In some other embodiments, three, four, or more microphones 270C may alternatively be disposed in the electronic device 200, to collect a sound signal, reduce noise, identify a sound source, implement a directional recording function, and the like.

The headset jack 270D is configured to connect to a wired headset. The headset jack 270D may be the USB interface 230, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 280A is configured to sense a pressure signal, and may convert the pressure signal into an electrical signal. In some embodiments, the pressure sensor 280A may be disposed on the display 294. There are many types of pressure sensors 280A, such as a resistive pressure sensor, an inductive pressure sensor, and a capacitive pressure sensor. The capacitive pressure sensor may include at least two parallel plates made of conductive materials. When a force is applied to the pressure sensor 280A, capacitance between electrodes changes. The electronic device 200 determines pressure intensity based on the change in the capacitance. When a touch operation is performed on the display 294, the electronic device 200 detects intensity of the touch operation based on the pressure sensor 280A. The electronic device 200 may also calculate a touch location based on a detection signal of the pressure sensor 280A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 280B may be configured to determine a motion posture of the electronic device 200. In some embodiments, an angular velocity of the electronic device 200 around three axes (namely, x, y, and z axes) may be determined by using the gyroscope sensor 280B. The gyroscope sensor 280B may be configured to implement image stabilization during photographing. For example, when the shutter is pressed, the gyroscope sensor 280B detects an angle at which the electronic device 200 jitters, obtains, through calculation based on the angle, a distance for which a lens module needs to compensate, and allows the lens to cancel the jitter of the electronic device 200 through reverse motion, to implement image stabilization. The gyroscope sensor 280B may also be used in a navigation scenario and a somatic game scenario.

The barometric pressure sensor 280C is configured to measure atmospheric pressure. In some embodiments, the electronic device 200 calculates an altitude by using a value of the atmospheric pressure measured by the barometric pressure sensor 280C, to assist positioning and navigation.

The magnetic sensor 280D includes a Hall effect sensor. The electronic device 200 may detect opening and closing of a flip leather case by using the magnetic sensor 280D. In some embodiments, when the electronic device 200 is a clamshell phone, the electronic device 200 may detect opening and closing of a flip cover based on the magnetic sensor 280D. Further, a feature, for example, automatic unlocking of the flip cover, is set based on a detected opening or closing state of the leather case or a detected opening or closing state of the flip cover.

The acceleration sensor 280E may detect magnitude of accelerations in various directions (usually on three axes) of the electronic device 200, and may detect magnitude and a direction of gravity when the electronic device 200 is static. The acceleration sensor 280E may be further configured to identify a posture of the electronic device, and is used in an application, for example, switching between a landscape mode and a portrait mode or a pedometer.

The distance sensor 280F is configured to measure a distance. The electronic device 200 may measure a distance in an infrared manner or a laser manner. In some embodiments, in a shooting scenario, the electronic device 200 may perform ranging by using the distance sensor 280F to implement fast focusing.

The optical proximity sensor 280G may include, for example, a light-emitting diode (LED) and an optical detector, for example, a photodiode. The light emitting diode may be an infrared light emitting diode. The electronic device 200 emits infrared light by using the light emitting diode. The electronic device 200 detects infrared reflected light from a nearby object by using the photodiode. When detecting sufficient reflected light, the electronic device 200 may determine that there is an object near the electronic device 200. When detecting insufficient reflected light, the electronic device 200 may determine that there is no object near the electronic device 200. The electronic device 200 may detect, by using the optical proximity sensor 280G, that the user holds the electronic device 200 close to an ear for a call, to automatically turn off a screen for power saving. The optical proximity sensor 280G may also be used for automatic screen unlocking and locking in a smart cover mode or a pocket mode.

The ambient light sensor 280L is configured to sense ambient light brightness. The electronic device 200 may adaptively adjust brightness of the display 294 based on the sensed ambient light brightness. The ambient light sensor 280L may also be configured to automatically adjust white balance during photographing. The ambient light sensor 280L may also cooperate with the optical proximity sensor 280G to detect whether the electronic device 200 is in a pocket to prevent an accidental touch.

The fingerprint sensor 280H is configured to collect a fingerprint. The electronic device 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the electronic device 200 executes a temperature processing policy by using the temperature detected by the temperature sensor 280J. For example, when the temperature reported by the temperature sensor 280J exceeds a threshold, the electronic device 200 lowers performance of a processor located near the temperature sensor 280J, to reduce power consumption and implement thermal protection. In some other embodiments, when the temperature is less than another threshold, the electronic device 200 heats the battery 242, to avoid a case in which the electronic device 200 is shut down abnormally due to a low temperature. In some other embodiments, when the temperature is less than still another threshold, the electronic device 200 boosts an output voltage of the battery 242, to avoid an abnormal shutdown caused by a low temperature.

The touch sensor 280K is also referred to as a "touch panel". The touch sensor 280K may be disposed in the display 294, and the touch sensor 280K and the display 294 form a touchscreen, which is also referred to as a "touchscreen". The touch sensor 280K is configured to detect a touch operation performed on or near the touch sensor 280K. The touch sensor may transfer the detected touch operation to the application processor to determine a type of the touch event. A visual output related to the touch operation may be provided by using the display 294. In some other embodiments, the touch sensor 280K may alternatively be disposed on a surface of the electronic device 200, or disposed in a position different from the display 294.

The bone conduction sensor 280M may obtain a vibration signal. In some embodiments, the bone conduction sensor 280M may obtain a vibration signal of a vibration bone of a human vocal-cord part. The bone conduction sensor 280M may also contact a pulse of a human body and receive a blood pressure pulse signal. In some embodiments, the bone conduction sensor 280M may also be disposed in the headset, to combine into a bone conduction headset. The audio module 270 may obtain a voice signal through parsing based on the vibration signal that is of the vibration bone of the vocal-cord part and that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, and the like. The button 290 may be a mechanical button, or may be a touch button. The electronic device 200 may receive a button input, and generate a button signal input related to a user setting and function control of the electronic device 200.

The motor 291 may generate a vibration prompt. The motor 291 may be configured to provide an incoming call vibration prompt and a touch vibration feedback. For example, touch operations performed on different applications (for example, photographing and audio playing) may correspond to different vibration feedback effects. The motor 291 may also generate different vibration feedback effects for touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, may be configured to indicate a charging status and a battery level change, and may also be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 200 interacts with a network by using the SIM card, to implement a call function, a data communication function, and the like. In some embodiments, the electronic device 200 uses an eSIM, that is, an embedded SIM card. The eSIM card may be embedded into the electronic device 200, and cannot be separated from the electronic device 200.

A software system of the electronic device 200 may use a layered architecture, an event-driven architecture, a microkernel architecture, a microservice architecture, or a cloud architecture. In the embodiments of this application, an example of an Android system of the hierarchical architecture is used to describe the software structure of the electronic device 200.

Figure 3:
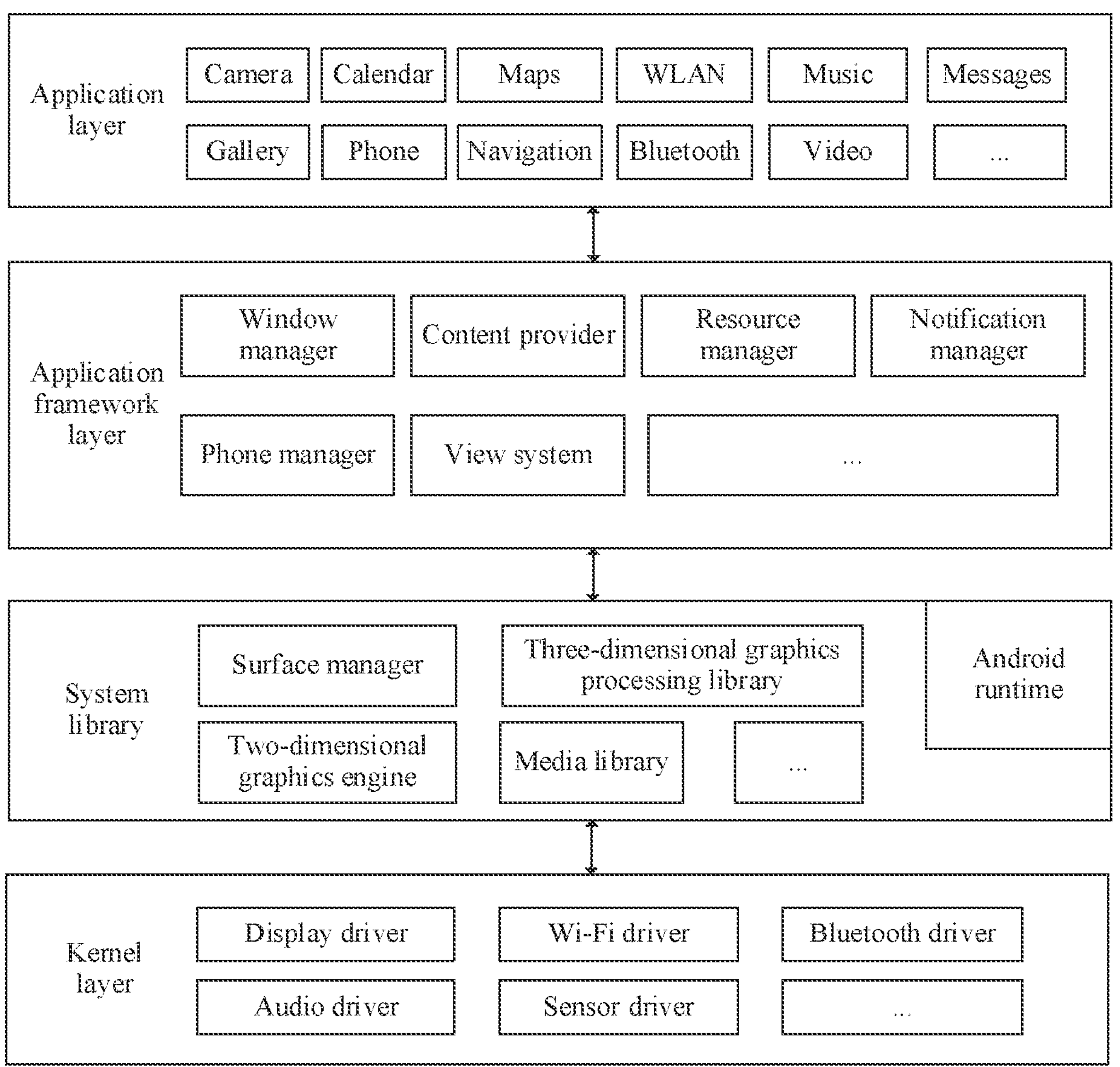
FIG. 3 is an example block diagram of a software structure of an electronic device 100 according to an embodiment of this application.

FIG. 3 is an example block diagram of a software structure of an electronic device 100 according to an embodiment of this application.

In a layered architecture of the electronic device 100, software is divided into several layers, and each layer has a clear role and task. The layers communicate with each other through a software interface. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 3, the application packages may include applications such as Camera. Gallery, Calendar, Phone, Map. Navigation. WLAN, Bluetooth, Music, Videos, and Messages.

An application framework layer provides an application programming interface (application programming interface, API) and a programming framework for an application at the application layer. The application framework layer includes some predefined functions.

As shown in FIG. 3, the application framework layer may include a window manager, a phone manager, a content provider, a view system, a resource manager, a notification manager, and the like.

The window manager is configured to manage a window program. The window manager may obtain a size of the display, determine whether there is a status bar, perform screen locking, take a screenshot, and the like.

The phone manager is configured to provide a communication function for the electronic device 100, for example, management of a call status (including answering, declining, or the like).

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view:

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a two-dimensional graphics engine (for example, SGL), a three-dimensional graphics processing library (for example, OpenGL ES), and a media library (Media Library).

The surface manager is configured to manage a display subsystem and provide fusion of 2D and 3D layers for a plurality of applications.

The 2D graphics engine is a drawing engine for 2D drawing.

The three-dimensional graphics processing library is configured to implement three-dimensional graphics drawing, image rendering, composition, layer processing, and the like.

The media library supports playback and recording in a plurality of commonly used audio and video formats, and static image files. The media library may support a plurality of audio and video encoding formats such as MPEG-4, H.264, MP3, AAC, AMR, JPG, and PNG.

The kernel layer is a layer between hardware and software. The kernel layer includes at least a display driver, an audio driver, a Wi-Fi driver, a sensor driver, and a Bluetooth driver.

It should be understood that components included in the software structure shown in FIG. 3 do not constitute a specific limitation on the electronic device 100. In some other embodiments of embodiments of this application, the electronic device 100 may include more or fewer components than those shown in the figure, or combine some components, or split some components, or have different component arrangements.

In an implementation of login authentication, after the user taps an icon of an application (a to-be-authenticated application), a login interface of the to-be-authenticated application pops up. Generally, a plurality of login manners are provided on the login interface, for example, WeChat account login, QQ account login, and mobile number login/registration. The mobile number login/registration means that the user needs to register an account of a to-be-authenticated application by using a mobile number, and then logs in to the to-be-authenticated application by using the account. This is a common login manner, and reference may be made to a conventional technology. Details are not described in this embodiment of this application. The WeChat account login and the QQ account login are login using an account of another application (an authentication application). In this manner, the user directly uses a registered account of the authentication application to log in to the to-be-authenticated application. This requires authorization of the authentication application. Therefore, once the user chooses to log in using the account of the authentication application, a login interface of the authentication application is displayed. After tapping authorization and logging in to the login interface, the user agrees to authorize the account of the authentication application to the to-be-authenticated application for login and use, and then enters a use interface of the to-be-authenticated application. In a login authentication process of the to-be-authenticated application, the authentication application and the to-be-authenticated application need to be installed on a same terminal, and the authentication application has been registered in advance and is in a logged-in state. If these conditions are not met, the login authentication process of the to-be-authenticated application is very complicated and even authentication cannot be completed, affecting user experience.

For example, the user installs an Honor of Kings application on the mobile phone of the user, and the user may choose to log in to the Honor of Kings by using a WeChat account or a QQ account. If the user chooses to use the WeChat account to log in to Honor of Kings, a WeChat application needs to be installed on the mobile phone of the user, and the WeChat application is logged in to the WeChat account, so that the user can successfully use the WeChat account to log in to Honor of Kings on the mobile phone of the user. If the user installs the Honor of Kings application on his tablet but does not install WeChat on his tablet, or even if the user installs WeChat but does not log in to the WeChat account, the operation process of logging in to the Honor of Kings using the WeChat account on the tablet becomes very complicated (for example, the user needs to install WeChat on his tablet and log in to the WeChat account) and cannot even complete login authentication.

In another implementation of login authentication, the user accesses a web page by using a browser of a computer. When the user wants to log in to the web page to use a membership function, the user first opens a login interface of the web page, a two-dimensional code is displayed, and then the user starts an application corresponding to the web page that is installed on a mobile phone, to enable a code scanning function of the application. After the two-dimensional code is scanned, a pop-up window is displayed on the mobile phone to prompt the user whether to authorize a login account of the application. In this case, after the user taps a button for agreeing to authorize the login account of the application on the pop-up window, the web page login is successful.

For example, the user accesses an iQIYI web page by using the browser of the computer. When the user wants to log in to the iQIYI web page to use an iQIYI membership function, the user first opens a login interface of the iQIYI web page, a two-dimensional code is displayed, and then the user starts an iQIYI application installed on the mobile phone, to enable a code scanning function of the iQIYI application. After the two-dimensional code is scanned, a pop-up window is displayed on the mobile phone to prompt the user to confirm the login. In this case, after the user taps a button for agreeing to the login on the pop-up window, the iQIYI web page login is successful.

The foregoing login authentication process is also a cross-device authentication method of the mobile phone and the computer. However, the login authentication process is established on a basis that the mobile phone and the computer have a same account of a same application. For example, the mobile phone has the iQIYI application, and the computer has the iQIYI web page. The user authorizes the login account of the iQIYI application to the iQIYI web page for the login. This is the authorization of the same login account in different application modes. It is not applicable to a scenario in which a login account of an application A is authorized to an application B for the login.

In view of this, based on the trusted network 10 in the foregoing embodiment, an embodiment of this application provides a cross-device authentication method, to simplify a login authentication process of an application.

Figure 4:
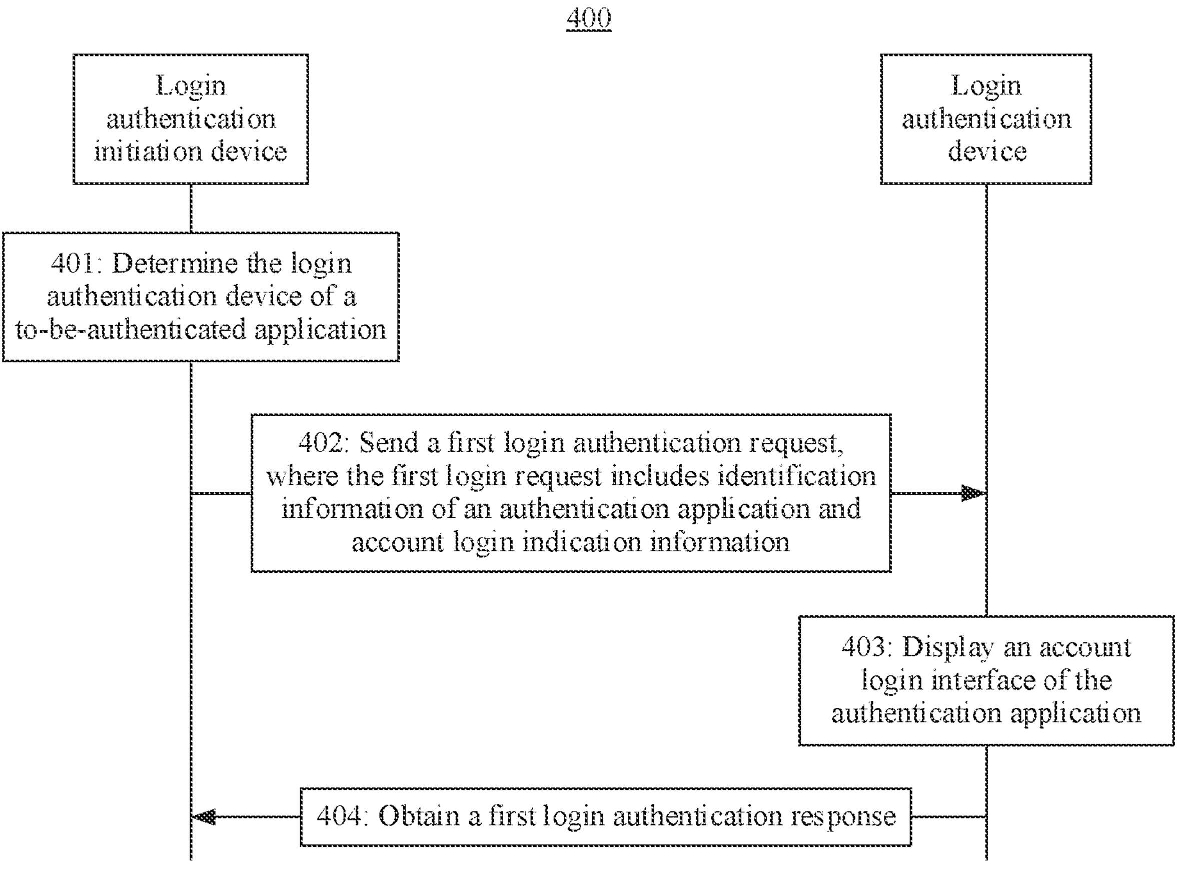
FIG. 4 is a flowchart of a process 400 of a cross-device authentication method according to an embodiment of this application.

FIG. 4 is a flowchart of a process 400 of a cross-device authentication method according to an embodiment of this application. The process 400 may be jointly executed by two electronic devices in the trusted network 10. One electronic device may be referred to as a login authentication initiation device, and the other electronic device may be referred to as a login authentication device. The process 400 is described as a series of steps or operations. It should be understood that the steps or the operations of the process 400 may be performed in various sequences and/or simultaneously, and are not limited to an execution sequence shown in FIG. 4. The process 400 may include the following steps.

Step 401: A login authentication initiation device determines a login authentication device of a to-be-authenticated application.

This embodiment of this application is based on an established trusted network. The login authentication initiation device may be an electronic device in the trusted network, and the login authentication device may be another electronic device in the trusted network.

The user installs the to-be-authenticated application on the login authentication initiation device. The to-be-authenticated application may be used after login authentication is performed by using an account, or some functions of the to-be-authenticated application may be used in a non-login state, and all functions after login authentication is performed by using the account may be used. The login authentication may refer to login authentication performed when the to-be-authenticated application is used for the first time, or may refer to login authentication performed when the to-be-authenticated application is used not for the first time. To improve login authentication efficiency and enable the user to log in to more applications by remembering a small quantity of accounts, the user may log in to the to-be-authenticated application by using a registered and logged-in login account of the authentication application. In this case, the login account of the authentication application needs to be authorized to the to-be-authenticated application. The login account of the authentication application may be, for example, a Huawei account, a WeChat account, a QQ account, a microblog account, or a Google account. The login account of the authentication application may include a user name (or a user ID) and a password. That the to-be-authenticated application is logged in by using a login account that has been registered and logged in to the authentication application may include, for example, a Huawei video is logged in by using a Huawei account, King of Honor is logged in by using a WeChat account, and Twitter is logged in by using a Google account.

In this embodiment of this application, the login authentication initiation device does not have an account authorization capability of the authentication application. Not having the account authorization capability of the authentication application may be understood as that no authentication application is installed, or although the authentication application is installed, the authentication application is logged in. Therefore, the login authentication initiation device cannot authorize the login account of the authentication application to the to-be-authenticated application.

As described above, the plurality of electronic devices included in the trusted network have a mutual trust relationship. Therefore, it may be considered that any two electronic devices can be mutually authenticated. Based on this, the login authentication initiation device may determine the login authentication device from a plurality of electronic devices (other than the login authentication initiation device) included in the trusted network.

The login authentication device needs to have the account authorization capability of the authentication application. Having the account authorization capability of the authentication application means that the authentication application is installed, registered and logged in, and login account information is retained. The trusted network may include one or more electronic devices that have the account authorization capability of the authentication application. The one or more electronic devices that have the account authorization capability of the authentication application may be referred to as candidate login authentication devices.

Optionally, the login authentication device may further meet one or more other conditions. For example, a security level of the login authentication device matches a security level of the login authentication initiation device. Alternatively, the login authentication device belongs to a specified electronic device type (for example, a mobile phone and/or a tablet), or the like. It should be noted that, in this embodiment of this application, another condition may be set to limit the login authentication device. The foregoing condition is not specifically limited. Similarly, the trusted network may include one or more electronic devices that have the account authorization capability of the authentication application and meet the foregoing conditions. The one or more electronic devices that have the account authorization capability of the authentication application and meet the foregoing conditions may also be referred to as candidate login authentication devices.

If there is only one candidate login authentication device, the candidate login authentication device may be directly determined as the login authentication device. In this way, the login authentication initiation device sends a first login authentication request to the login authentication device, to perform the following steps. In this case, login authentication of the to-be-authenticated application can be completed when the first login authentication response of the login authentication device is received. If there are a plurality of candidate login authentication devices, the plurality of candidate login authentication devices may be displayed on the screen, and the user selects one of the candidate login authentication devices as the login authentication device. In this way, the login authentication initiation device sends the first login authentication request to the login authentication device, to perform the following steps. In this case, login authentication of the to-be-authenticated application can be completed when the first login authentication response of the login authentication device is received. If there are a plurality of candidate login authentication devices, all the plurality of candidate login authentication devices may be determined as login authentication devices. In this way, the login authentication initiation device separately sends the first login authentication request to the plurality of login authentication devices, to perform the following steps. In this case, login authentication of the to-be-authenticated application can be completed as long as the first login authentication response of one of the plurality of login authentication devices is received.

Step 402: The login authentication initiation device sends a first login authentication request to the login authentication device, where the first login authentication request includes identification information of the authentication application and account login indication information.

The identification information of the authentication application indicates the authentication application expected by the user. The identification information may include an authentication application name, an authentication reference index, or the like, so that the login authentication device can determine, based on the identification information, an authentication application corresponding to the authentication application.

In some embodiments, the identification information of the authentication application may be a package name (packageName) of the authentication application, or may be a package index (packageIndex) of the authentication application. For example, the identification information of the authentication application may be represented as packageName=WeChat application, or packageIndex=001. Therefore, the login authentication device may determine, based on the identification information of the authentication application, that a to-be-requested authentication request is a WeChat application.

The account login indication information indicates that confirmation of the account login of the authentication application is to be performed on the login authentication device, so that the login authentication device pops up an account login interface of the authentication application on a screen.

In some embodiments, the account login indication information may be a component name (compontName) corresponding to the account login interface on the authentication application. For example, the account login indication information may be represented as compontName=account login. Therefore, the login authentication device may determine, based on the account login indication information, that the account login interface of the authentication application is to be started.

For example, the user installs the King of Honor application on the tablet, and chooses to log in to King of Honor by using the WeChat account. However, WeChat is not installed on the tablet of the user, but WeChat is installed and logged in to the mobile phone of the user. In this case, the tablet sends a first login authentication request to the mobile phone, where the first login authentication request includes a WeChat name and account login indication information. In this way, the mobile phone may determine that the tablet requests confirmation of account login of the WeChat application.

Step 403: The login authentication device displays the account login interface of the authentication application.

The login authentication device displays the account login interface of the authentication application on the screen in response to the first login authentication request. The account login interface may include one or more of an authorization content statement, a privacy statement, an "Authorize and login" button, and a "Cancel" button.

When the user taps the "Authorize and login" button, it indicates that the user agrees to authorize the account of the authentication application to the to-be-authenticated application. In this case, the to-be-authenticated application may log in to the to-be-authenticated application by using the account of the authentication application. When the user taps the "Cancel" button, it indicates that the user does not agree to authorize the account of the authentication application to the to-be-authenticated application. In this case, the to-be-authenticated application cannot log in to the to-be-authenticated application by using the account of the authentication application.

For example, when the authentication application is WeChat, a mobile phone of the user displays a WeChat account login interface, where the interface includes the "Authorize and login" button and the "Cancel" button. When the user taps the "Authorize and login" button, it indicates that the user agrees to authorize the WeChat account to the King of Honor application for login. When the user taps the "Cancel" button, the user does not agree to authorize the WeChat account to the King of Honor application for login.

Step 404: The login authentication initiation device obtains the first login authentication response.

Based on the foregoing tapping operation of the user, the login authentication device feeds back a login authentication result to the login authentication initiation device by using the first login authentication response.

For example, when the user taps the "Authorize and login" button, and a corresponding first login authentication response includes information, for example, "login authentication succeeds" or "login success", the login authentication initiation device enters a use interface of the to-be-authenticated application. When the user taps the "Cancel" button, the corresponding first login authentication response includes information, for example, "login authentication fails" or "login failed", the login authentication initiation device exits the to-be-authenticated application, switches back to a home screen, and/or pops up a window indicating that the authentication fails.

For example, when the first login authentication response obtained by the tablet includes information indicating that the login authentication of the King of Honor application succeeds, the tablet displays a game interface of King of Honor, and the user may start to play King of Honor. When the first login authentication response obtained by the tablet includes information indicating that the login authentication of the King of Honor application fails, the tablet exits King of Honor, and displays a home screen of the tablet, or displays a preset animation video of King of Honor on the tablet without entering the game interface, or displays a dialog box on the tablet, indicating that the login to the King of Honor application fails.

In this embodiment of this application, the login authentication initiation device initiates a login authentication request to the login authentication device that belongs to a same trusted network, and the user authorizes login on an account login interface of the authentication application installed on the login authentication device. Therefore, the to-be-authenticated application installed on the login authentication initiation device logs in by using the logged-in account of the authentication application. In this way, if the login authentication initiation device does not have the account authorization capability of the authentication application, cross-device login authentication can be quickly implemented. Therefore, a complicated process of installing and logging in to the authentication application on the login authentication initiation device can be avoided, and the user does not need to be forced to install the authentication application on all electronic devices. This ensures data security of the user.

Figure 5:
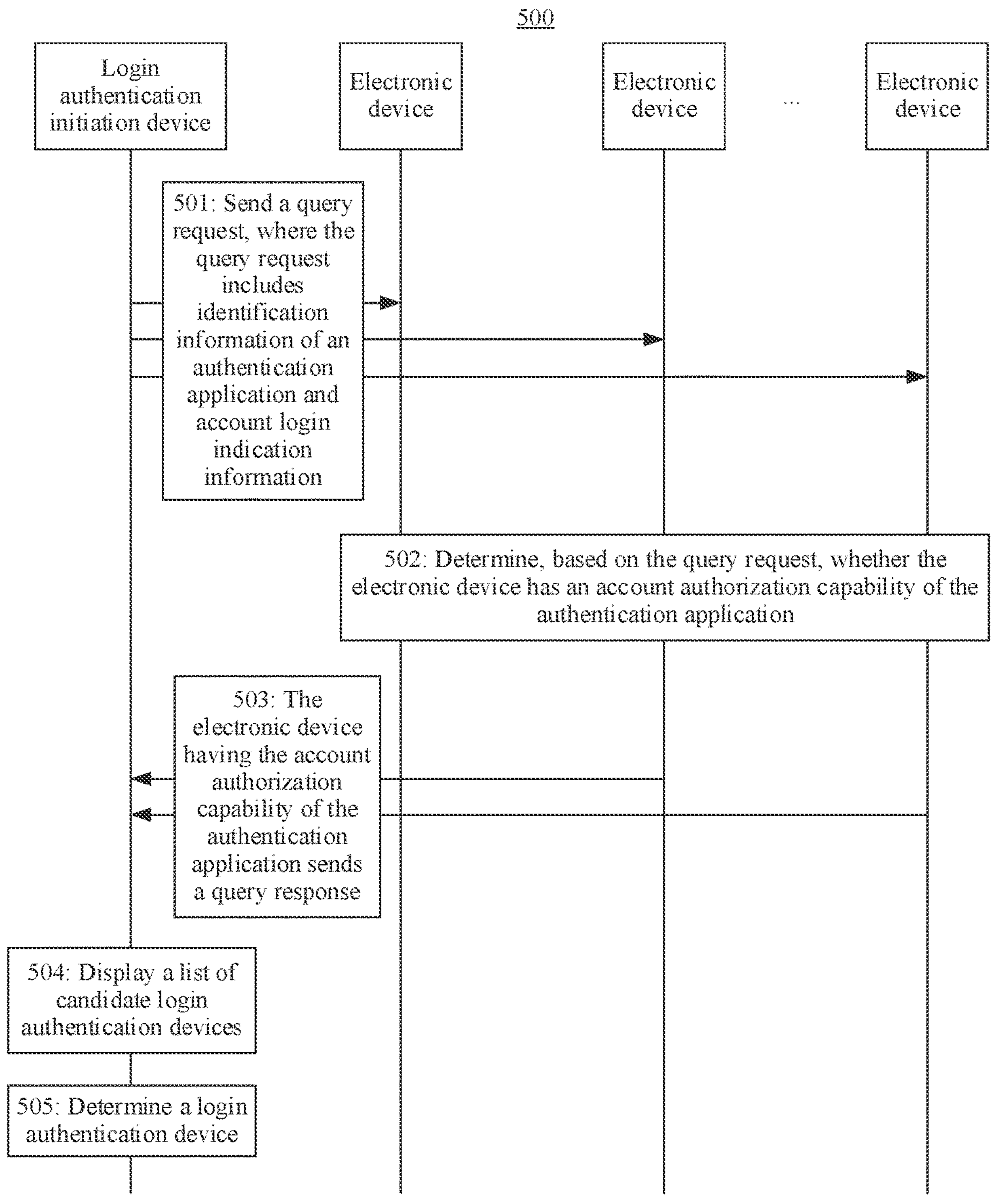
FIG. 5 is a flowchart of a process 500 of a login authentication device determining method according to an embodiment of this application.

FIG. 5 is a flowchart of a process 500 of a login authentication device determining method according to an embodiment of this application. The process 500 may be jointly performed by a plurality of electronic devices in the trusted network 10, where one electronic device may be referred to as a login authentication initiation device. The process 500 may be a specific implementation of step 401 in the foregoing method embodiment. The process 500 includes a series of steps or operations. It should be understood that the process 500 may be performed in various sequences and/or simultaneously, and is not limited to an execution sequence shown in FIG. 5. The process 500 may include the following steps.

Step 501: A login authentication initiation device sends a query request to one or more electronic devices, where the query request includes identification information of an authentication application and account login indication information.

After determining the authentication application expected by the user and a purpose of requesting login authentication from the authentication application, the login authentication initiation device may send a query request to one or more electronic devices in the trusted network, and add the identification information of the authentication application and the account login indication information to the query request, so that the electronic device that receives the query request performs self-check on whether the electronic device has the account authorization capability of the authentication application.

In a possible implementation, the query request may include parameter information (paramInfo), and the parameter information may include a package name (packageName) of the authentication application and a component name (compontName) for account login, for example, packageName-WeChat application, and compontName=Account login: or packageName-Huawei ID application, and compontName=Account login. In this implementation, the package name of the authentication application may be the identification information of the authentication application, and the component name for account login may be the account login indication information.

The one or more electronic devices may be all other electronic devices in a trusted network except the login authentication initiation device. Alternatively, the one or more electronic devices may be some other electronic devices in a trusted network except the login authentication initiation device, and the other electronic devices may be electronic devices that meet one or more conditions in step 401. The login authentication initiation device performs screening on all other electronic devices other than the login authentication initiation device in the trusted network based on the foregoing condition.

For example, the trusted network includes a tablet, a mobile phone, and a watch. The user taps an icon of a King of Honor application on the tablet, and chooses to use a WeChat account on a login interface of the King of Honor application to log in to King of Honor, but no WeChat application is installed on the tablet. In this case, the tablet may separately send a query request to the mobile phone and the watch. The query request includes, packageName=Wechat application, and compontName=account login.

Step 502: The electronic device determines, based on the query request, whether the electronic device has the account authorization capability of the authentication application.

The electronic device may be any electronic device that receives the query request. The electronic device may self-check, based on the query request, whether the authentication application is installed and whether the authentication application is logged in. If the electronic device installs and logs in to the authentication application, it indicates that the electronic device has the account authorization capability of the authentication application.

For example, after receiving the query request, the mobile phone and the watch self-check whether the WeChat application is installed based on packageName=Wechat application in the query request, and then self-check whether the WeChat application has been logged in based on compontName-account login. In this case, the mobile phone determines that the WeChat application is installed and is logged in. Therefore, the mobile phone may determine that the mobile phone has the account authorization capability of the authentication application, but the watch finds that WeChat is not installed. Therefore, the watch may determine that the mobile phone does not have the account authorization capability of the authentication application.

Step 503: The electronic device having the account authorization capability of the authentication application sends a query response to the login authentication initiation device.

The electronic device having the account authorization capability of the authentication application may be any one of all electronic devices that receive the query request (indicating that all the electronic devices that receive the query request have the account authorization capability of the authentication application) in step 502, or may be any one of some of all electronic devices that receive the query request (indicating that some of all the electronic devices that receive the query request have the account authorization capability of the authentication application) in step 502.

The query response may include identification information of the electronic device that sends the query response, and is used to notify the login authentication initiation device of the electronic device that sends the query response.

For example, the mobile phone returns a query response to the tablet, and adds a device identifier of the mobile phone, for example, HUAWEI P30pro, to the query response.

Step 504: The login authentication initiation device displays a list of candidate login authentication devices.

In step 503, a quantity of query responses received by the login authentication initiation device is the same as a quantity of electronic devices that have the account authorization capability of the authentication application. The login authentication initiation device displays the corresponding electronic devices as the candidate login authentication devices on the screen based on the identification information of the electronic devices that is carried in each query response, for selection by the user.

Step 505: The login authentication initiation device determines a login authentication device.

In an implementation, the login authentication initiation device displays one or more candidate login authentication devices on the screen, and the user may tap one of the candidate login authentication devices displayed on the screen as the selected login authentication device. The login authentication initiation device obtains, based on the foregoing operation of the user, the candidate login authentication device tapped by the user, and determines the candidate login authentication device as the final login authentication device.

In this embodiment of this application, the login authentication device and the login authentication initiation device belong to a same trusted network, and the login authentication device has an account authorization capability of the authentication application, and may further meet another set condition. In this way, data security of the user can be ensured.

Figure 6:
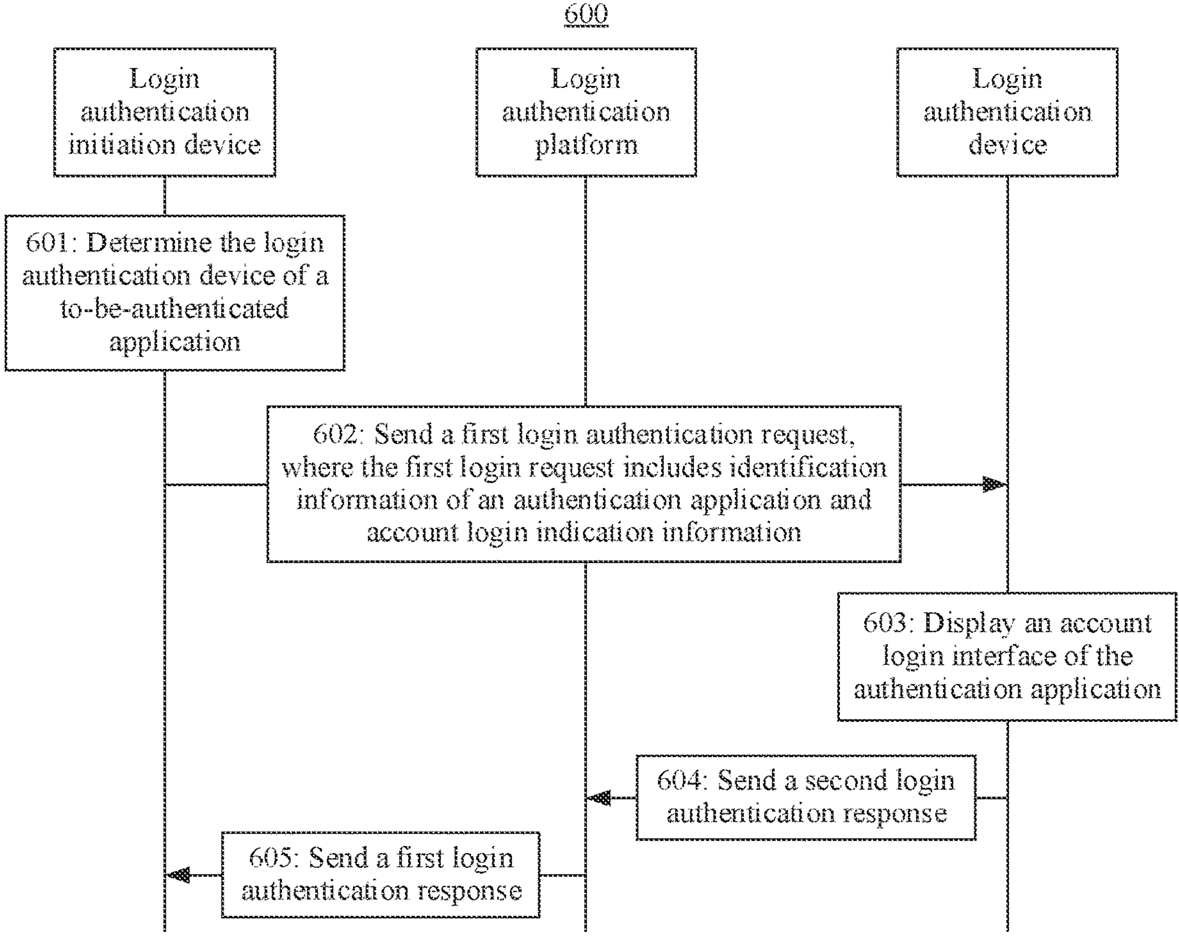
FIG. 6 is a flowchart of a process 600 of a cross-device authentication method according to an embodiment of this application.

FIG. 6 is a flowchart of a process 600 of a cross-device authentication method according to an embodiment of this application. The process 600 may be jointly executed by two electronic devices in the trusted network 10 and a login authentication platform. One electronic device may be referred to as a login authentication initiation device, the other electronic device may be referred to as a login authentication device, and the login authentication platform may be a server of an authentication application, for example, a server of a Huawei account application. The process 600 includes a series of steps or operations. It should be understood that the process 600 may be performed in various sequences and/or simultaneously, and is not limited to an execution sequence shown in FIG. 6. The process 600 may include the following steps.

Step 601: A login authentication initiation device determines a login authentication device of a to-be-authenticated application.

In this embodiment of this application, the login authentication initiation device may directly obtain identification information of the authentication application and account login indication information. For example, the to-be-authenticated application is a Jnotes application, and the authentication application is a Huawei account application. The two applications are produced by a same manufacturer. Alternatively, the two applications may both register involved component names with an operating system during installation, or for another reason, the login authentication initiation device may directly obtain the identification information of the authentication application and the account login indication information. This is not specifically limited. Therefore, the login authentication initiation device may determine the login authentication device of the to-be-authenticated application with reference to step 401 in the foregoing method embodiment and the method embodiment shown in FIG. 5. Details are not described herein again.

Step 602: The login authentication initiation device sends a first login authentication request to the login authentication device, where the first login authentication request includes the identification information of the authentication application and the account login indication information.

For step 602, refer to step 402 in the foregoing method embodiment. Details are not described herein again.

Step 603: The login authentication device displays an account login interface of the authentication application.

For step 603, refer to step 403 in the foregoing method embodiment. Details are not described herein again.

Step 604: The login authentication device sends a second login authentication response to the login authentication platform.

Based on a tapping operation performed by a user on the account login interface of the authentication application, the login authentication device feeds back a login authentication result to the login authentication platform by using the second login authentication response.

For example, when the user taps an "Authorize and login" button, the corresponding second login authentication response includes Flag=1, indicating that the user agrees to authorize a login account of the authentication application to the to-be-authenticated application for login. When the user taps a "Cancel" button, the corresponding second login authentication response includes Flag=0, indicating that the user does not agree to authorize the login account of the authentication application to the to-be-authenticated application for login. It should be understood that another field, an identifier, or a syntax element in the second login authentication response may indicate the login authentication result. An implementation of the information that is included in the second login authentication response and that indicates the login authentication result is not specifically limited in this application.

Step 605: The login authentication platform sends a first login authentication response to the login authentication initiation device.

After receiving the second login authentication response, the login authentication platform starts, based on information that is included in the second login authentication response and that indicates a login authentication result, login authentication of the to-be-authenticated application. For example, when the second login authentication response includes Flag=1, the login authentication platform passes the login authentication on the to-be-authenticated application. When the second login authentication response includes Flag=0, the login authentication platform fails the login authentication of the to-be-authenticated application.

The login authentication platform sends the first login authentication response to the login authentication initiation device based on the login authentication result. For the first login authentication response, refer to the description in step 404 in the foregoing method embodiment. Details are not described herein again.

In this embodiment of this application, the login authentication initiation device initiates a login authentication request to the login authentication device that belongs to a same trusted network, and the user authorizes login on an account login interface of the authentication application installed on the login authentication device. Therefore, the to-be-authenticated application installed on the login authentication initiation device logs in by using the logged-in account of the authentication application. In this way, if the login authentication initiation device does not have the account authorization capability of the authentication application, cross-device login authentication can be quickly implemented. Therefore, a complicated process of installing and logging in to the authentication application on the login authentication initiation device can be avoided, and the user does not need to be forced to install the authentication application on all electronic devices. This ensures data security of the user.

Figure 7:
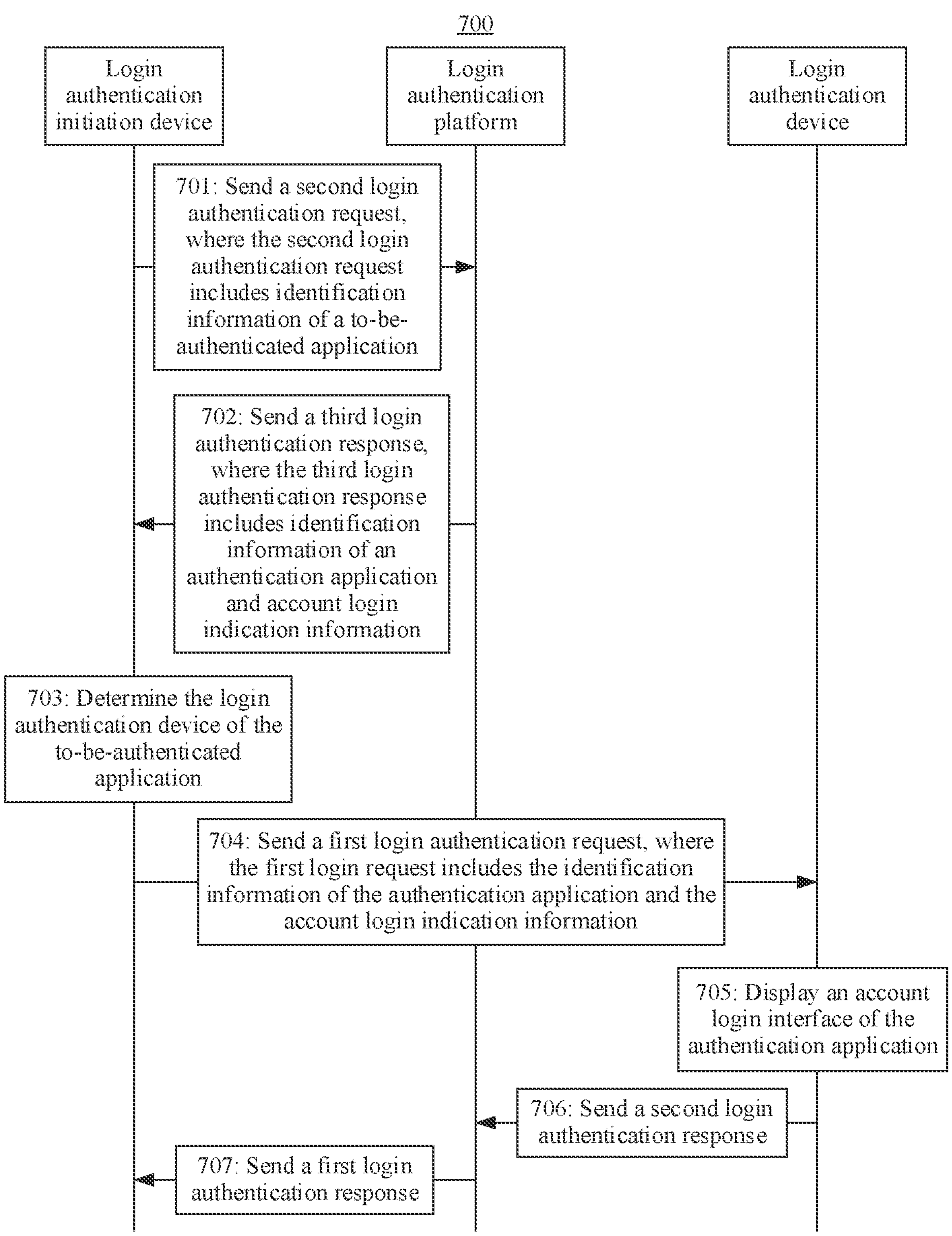
FIG. 7 is a flowchart of a process 700 of a cross-device authentication method according to an embodiment of this application.

FIG. 7 is a flowchart of a process 700 of a cross-device authentication method according to an embodiment of this application. The process 700 may be jointly executed by two electronic devices in the trusted network 10 and a login authentication platform. One electronic device may be referred to as a login authentication initiation device, the other electronic device may be referred to as a login authentication device, and the login authentication platform may be a server of an authentication application, for example, a WeChat server or a microblog server. The process 700 is described as a series of steps or operations. It should be understood that steps or operations of the process 700 may be performed in various sequences and/or simultaneously, not limited to an execution sequence shown in FIG. 7. The process 700 may include the following steps.

Step 701. A login authentication initiation device sends a second login authentication request to a login authentication platform, where the second login authentication request includes identification information of a to-be-authenticated application.

A difference between this embodiment of this application and the method embodiment shown in FIG. 6 lies in that the login authentication initiation device may directly obtain identification information of the authentication application, but cannot directly obtain account login indication information. Therefore, the second login authentication request needs to be sent to the login authentication platform, to notify the login authentication platform of the to-be-authenticated application. In this way, the account login indication information is obtained from the login authentication platform.

For example, the to-be-authenticated application is a King of Honor application, and the authentication application is a WeChat application. The login authentication initiation device cannot directly obtain the account login indication information because involved component names are not registered with an operating system during installation of the two applications or due to other reasons. This is not specifically limited. The login authentication initiation device sends the second login authentication request to the WeChat server, where the second login authentication request includes a name of the King of Honor application.

Step 702: The login authentication platform sends a third login authentication response to the login authentication initiation device, where the third login authentication response includes the identification information of the authentication application and the account login indication information.

The identification information of the authentication application may be a package name (packageName) of the authentication application, and the account login indication information may be a component name (compontName) for account login. For example, the third login authentication response includes packageName=Wechat application, and compontName=account login.

Step 703: The login authentication initiation device determines a login authentication device of the to-be-authenticated application.

After receiving the third login authentication response, the login authentication initiation device may obtain the account login indication information based on the third login authentication response in addition to the known identification information of the authentication application. On a premise that the identification information of the authentication application and the account login indication information are available, the login authentication initiation device may determine the login authentication device of the to-be-authenticated application by referring to step 401 in the foregoing method embodiment and the method embodiment shown in FIG. 5. Details are not described herein again.

Step 704: The login authentication initiation device sends a first login authentication request to the login authentication device, where the first login authentication request includes the identification information of the authentication application and the account login indication information.

For step 704, refer to step 402 in the foregoing method embodiment. Details are not described herein again.

Step 705: The login authentication device displays an account login interface of the authentication application.

For step 705, refer to step 403 in the foregoing method embodiment. Details are not described herein again.

Step 706: The login authentication device sends a second login authentication response to the login authentication platform.

For step 706, refer to step 604 in the foregoing method embodiment. Details are not described herein again.

Step 707: The login authentication platform sends a first login authentication response to the login authentication initiation device.

For step 707, refer to step 605 in the foregoing method embodiment. Details are not described herein again.

In this embodiment of this application, the login authentication initiation device initiates a login authentication request to the login authentication device that belongs to a same trusted network, and the user authorizes login on an account login interface of the authentication application installed on the login authentication device. Therefore, the to-be-authenticated application installed on the login authentication initiation device logs in by using the logged-in account of the authentication application. In this way, if the login authentication initiation device does not have the account authorization capability of the authentication application, cross-device login authentication can be quickly implemented. Therefore, a complicated process of installing and logging in to the authentication application on the login authentication initiation device can be avoided, and the user does not need to be forced to install the authentication application on all electronic devices. This ensures data security of the user.

The following describes the process of the foregoing method embodiment by using a specific embodiment.

For example, in this embodiment of this application, a plurality of electronic devices in a same local area network form a trusted network, and the trusted network includes: Two phones (P30Pro and Mate30), one tablet (MatePad Pro), one smart screen (V65), and one Huawei watch (WATCH GT2). The to-be-authenticated application is a Jnotes application, and the user installs the Jnotes application on the P30pro. Therefore, the P30pro is the login authentication initiation device.

Figure 8A:
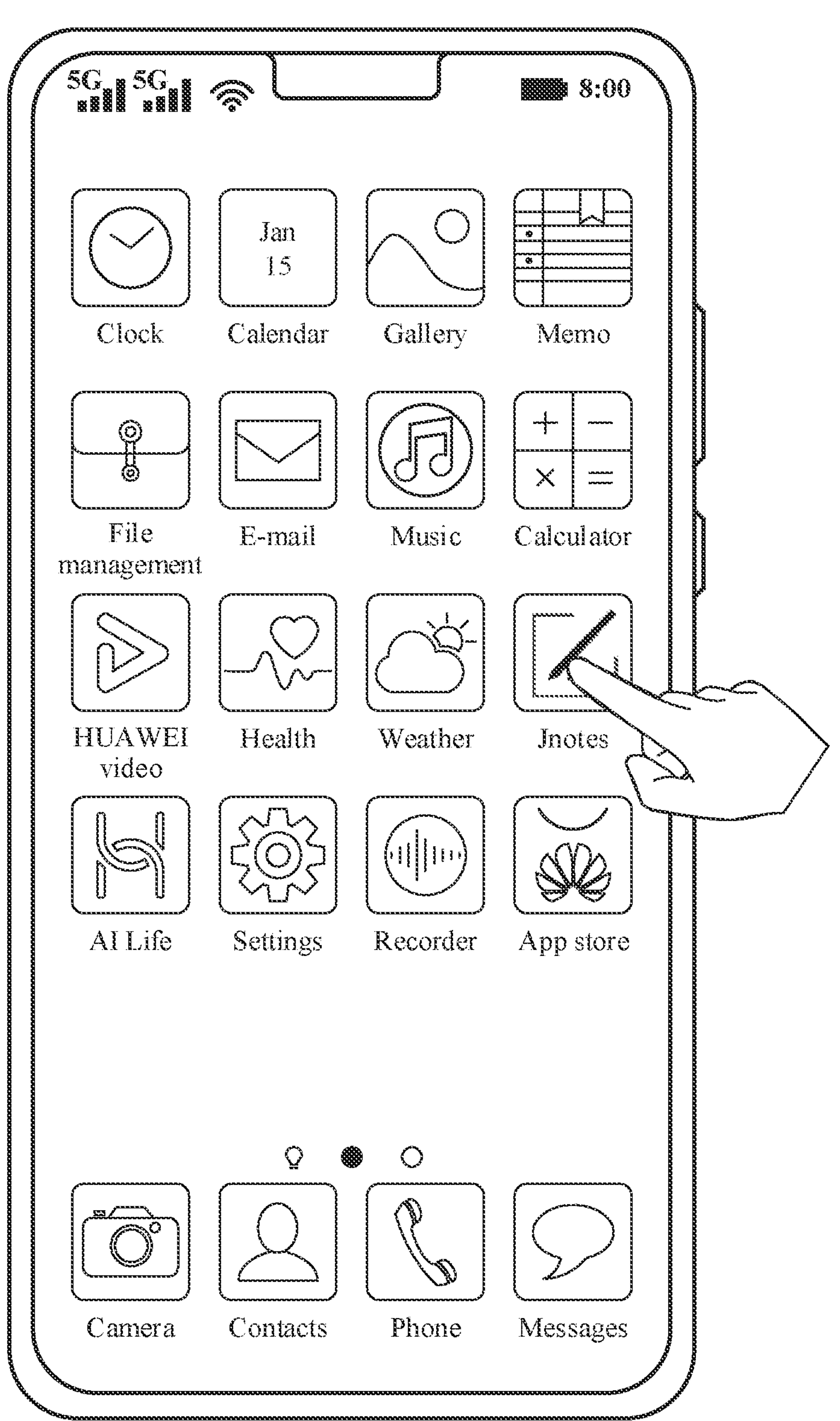
FIG. 8*a* is a schematic diagram of a home screen of a P30pro.

FIG. 8*a* is a schematic diagram of a home screen of a P30pro. A user taps an icon of a Jnotes application on the home screen to open the Jnotes application.

Figure 8B:
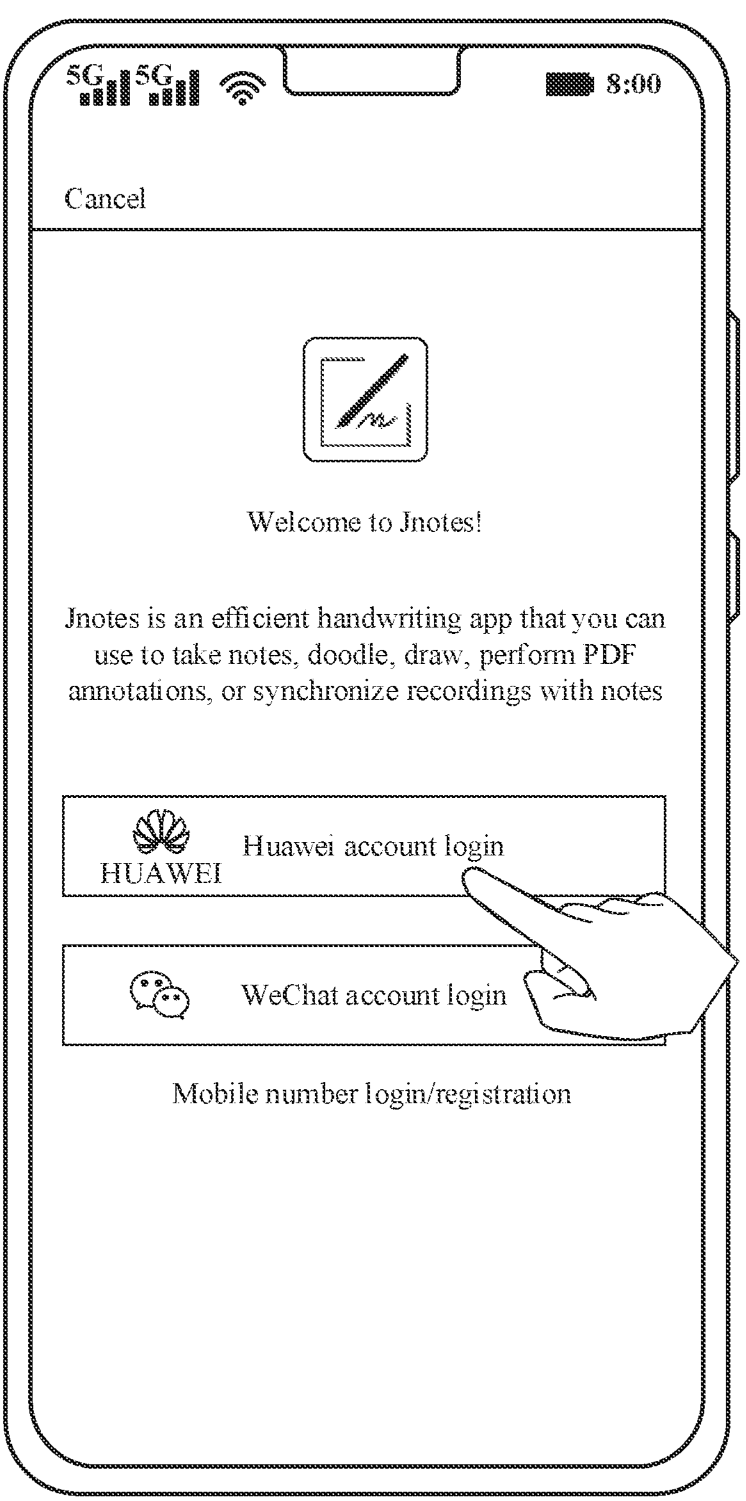
FIG. 8*b* is a schematic diagram of a login interface of a Jnotes application.

FIG. 8*b* is a schematic diagram of a login interface of a Jnotes application. As shown in FIG. 8*b*, the login interface of the Jnotes application includes an icon of the Jnotes application, a text introduction of the Jnotes application, and three optional login manners of the Jnotes application. The three optional login manners include "Huawei account login". "WeChat account login", and "Mobile number login/registration". The two manners of "Huawei account login" and "WeChat account login" are manners in which the Jnotes application is logged in by using an account of the authentication application (a Huawei account application or a WeChat application). The user can tap a "Huawei account login" button or a "WeChat account login" button. The selected button is the authentication application, for example, the Huawei account application, and it indicates that the user wants to use the Huawei account to log in to the Jnotes application.

In addition, if the user taps "Mobile number login/registration", it indicates that the user does not log in to the Jnotes application by using an account of the authentication application, but needs to register an account of the Jnotes application by using a mobile number. This manner may use a conventional technology, and is not specifically limited or described in this embodiment of this application.

After obtaining an operation instruction generated when the user taps the "Huawei account login" button, the P30pro sends a query request to other electronic devices in the trusted network, where the query request includes identification information of the Huawei account application and account login indication information. Before that, the P30pro can send the query request only to mobile phones, the tablet, and the wearable device. Therefore, the query request is sent only to the Mate30, the MatePad Pro, and the WATCH GT2, but not to the V65 in a trusted network.

After receiving the query request, the Mate30, the MatePad Pro, and the WATCH GT2 respectively determine that the application is the Huawei account application based on the identification information, and determine, based on the indication information, that the account login of the Huawei account application is to be confirmed. Therefore, the Mate30, the MatePad Pro, and the WATCH GT2 checks whether the Huawei account application is installed and logged in. At this time, the WATCH GT2 detects that the Huawei account application is not logged in. Therefore, only the Mate30 and MatePad Pro send a query response to the P30pro, where the query responses carry respective device identifiers.

Figure 8C:
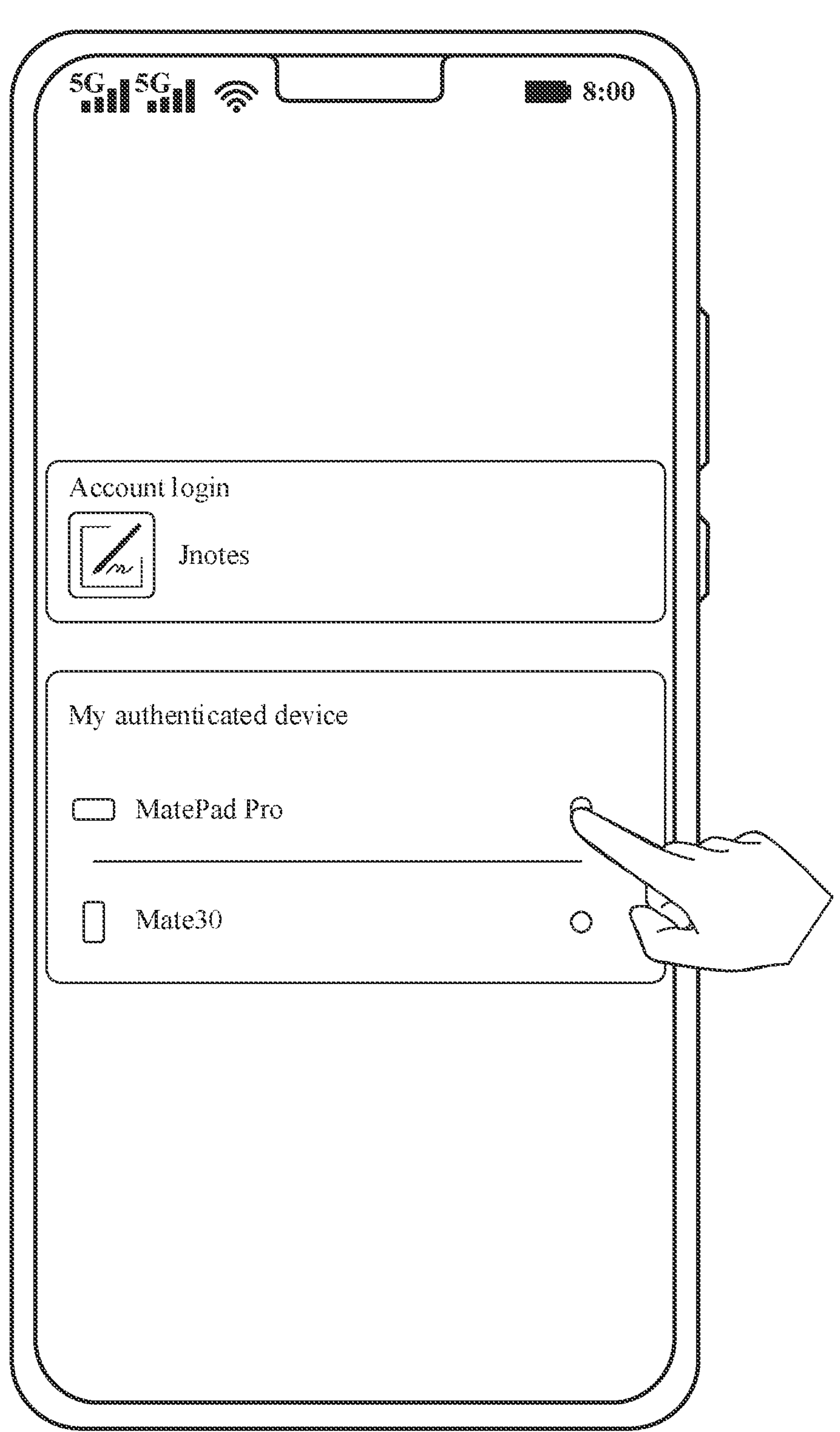
FIG. 8*c* is a schematic diagram of a list of candidate login authentication devices.

FIG. 8*c* is a schematic diagram of a list of candidate login authentication devices. As shown in FIG. 8*c*, after receiving two query responses, the P30pro displays a list of my authenticated devices (namely, the candidate login authentication devices) on a screen, where the list includes the Mate30 and the MatePad Pro. The user finds that the MatePad Pro is at hand and easy to operate. Therefore, tapping the MatePad Pro indicates that the user selects the MatePad Pro as the login authentication device.

After receiving the operation instruction generated by the foregoing operation, the P30pro sends a first login authentication request to the MatePad Pro, where the first login authentication request includes the identification information of the Huawei account application and the account login indication information.

Figure 8D:
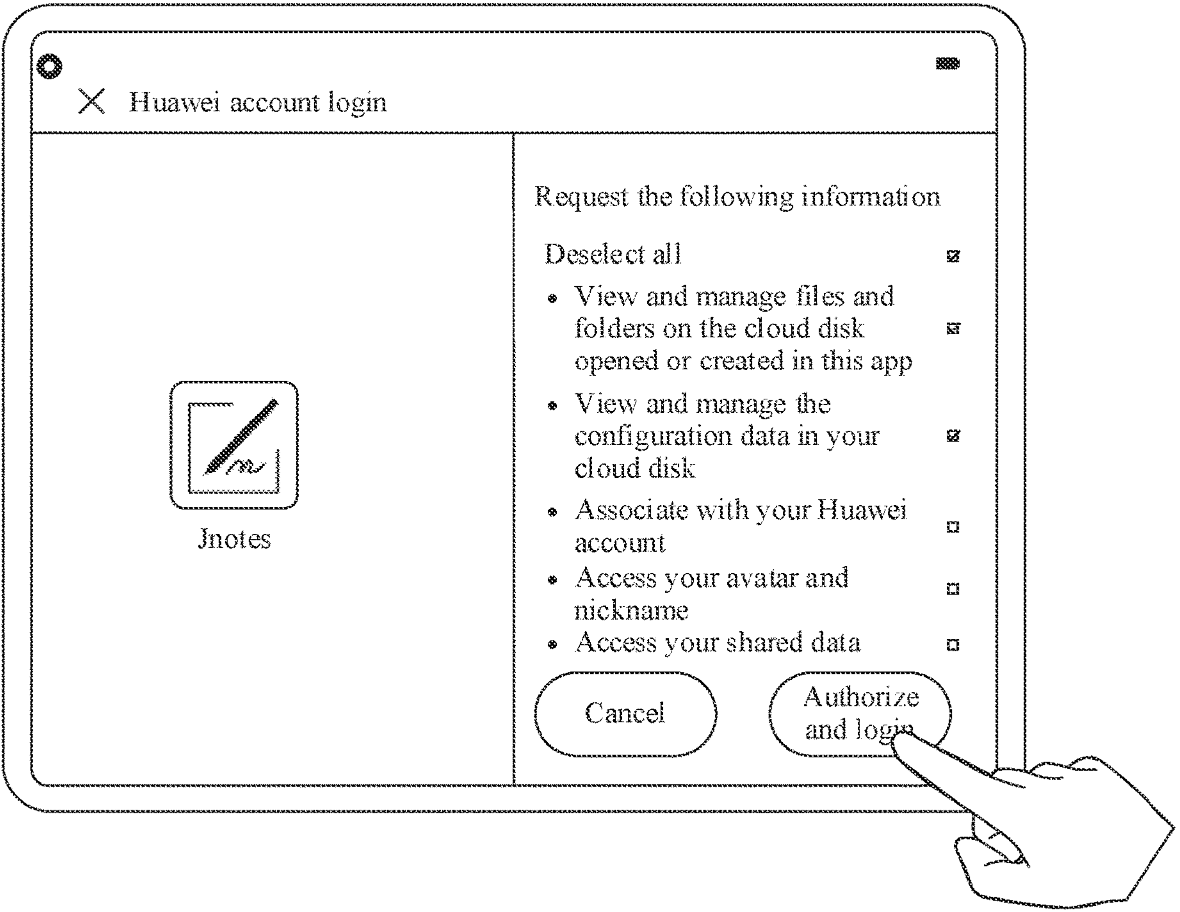
FIG. 8*d* is a schematic diagram of an account login interface.

FIG. 8*d* is a schematic diagram of an account login interface. As shown in FIG. 8*d*, after receiving a first login authentication request, the MatePad Pro displays a Huawei account login interface on a screen. The login interface includes an icon and a name of a Jnotes application, a text description of application information, selection buttons, and "Authorize and login" and "Cancel" buttons. The user can select available information as required, and tap selection buttons of items to be selected. If "√" appears, the items are selected. When the user taps the button "Authorize and login", it indicates that the user agrees to authorize the Huawei account to the Jnotes application. In this case, the Jnotes application can use the Huawei account to log in to the system. If the user taps the "Cancel" button, it indicates that the user does not agree to authorize the Huawei account to the Jnotes application. In this case, the Huawei account cannot be used to log in to the Jnotes application.

The MatePad Pro sends a second login authentication response to the server of the Huawei account, and the server of the Huawei account starts login authentication on the Jnotes application based on information that is included in the second login authentication response and that indicates a login authentication result. For example, when the second login authentication response includes Flag=1, the server of the Huawei account passes the login authentication of the Jnotes application. When the second login authentication response includes Flag=0, the server of the Huawei account fails the login authentication of the Jnotes application.

The server of the Huawei account sends a first login authentication response to the P30pro. The P30pro performs a corresponding subsequent operation based on the first login authentication response.

Figure 8E:
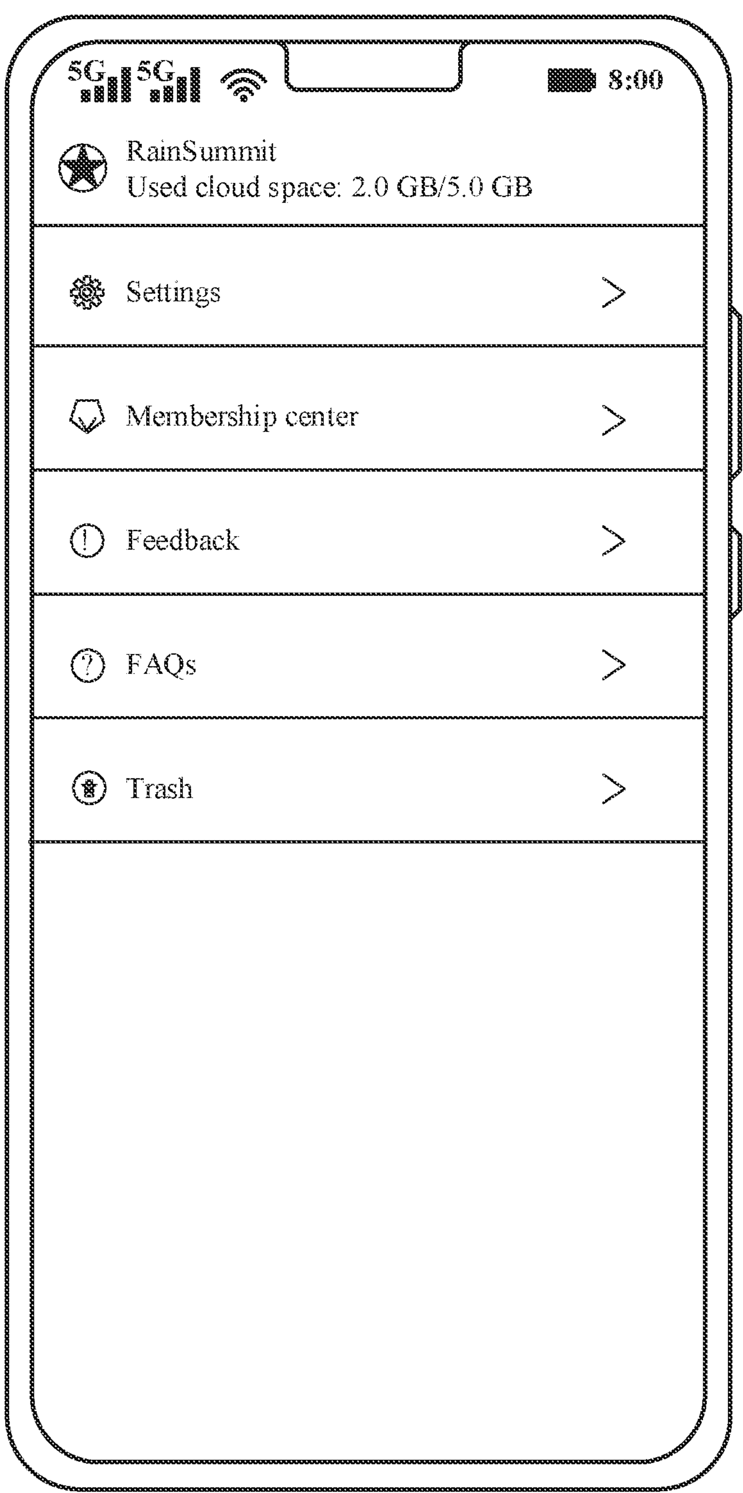
FIG. 8*e* is a schematic diagram of a use interface of a Jnotes application.
Figure 8F:
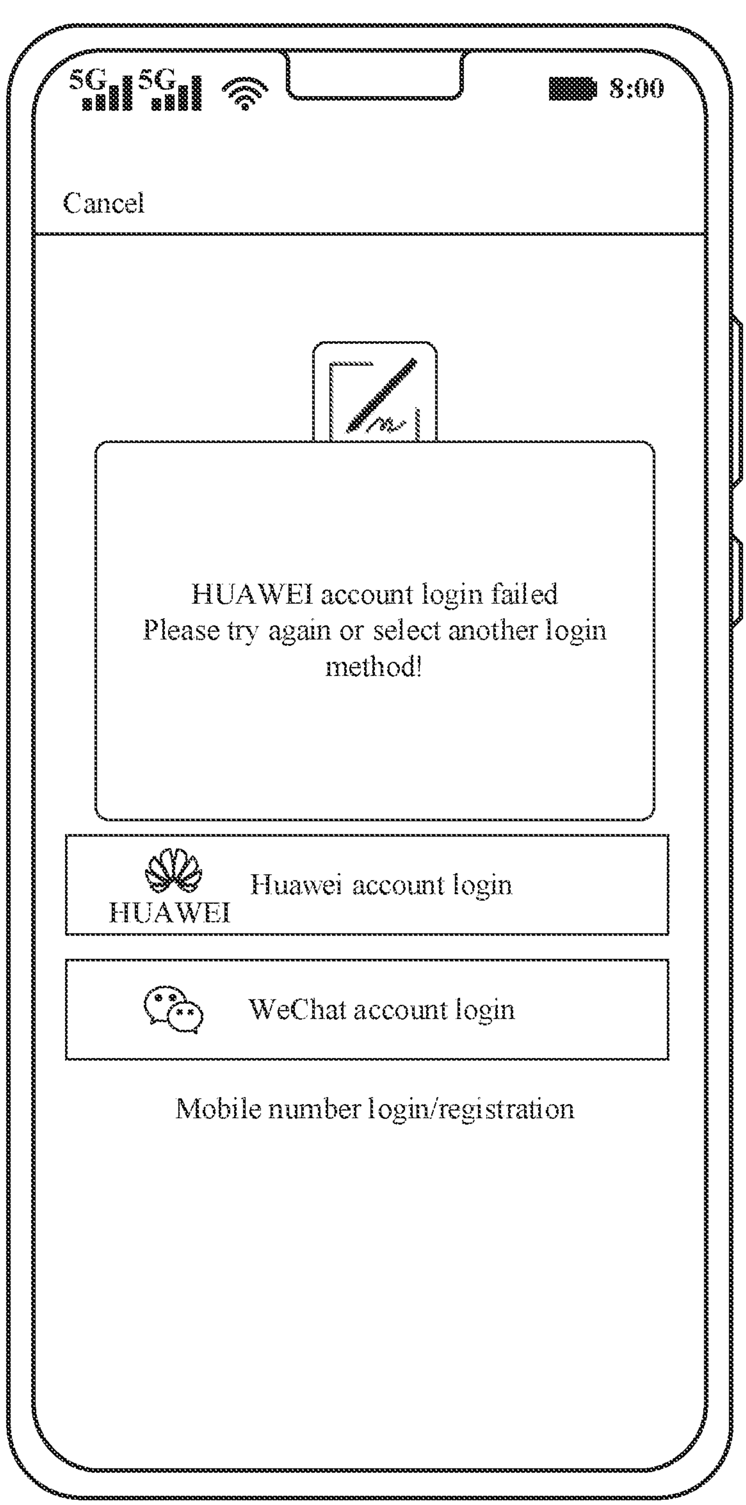
FIG. 8*f* is a schematic diagram of a login interface of a Jnotes application.
Figure 8G:
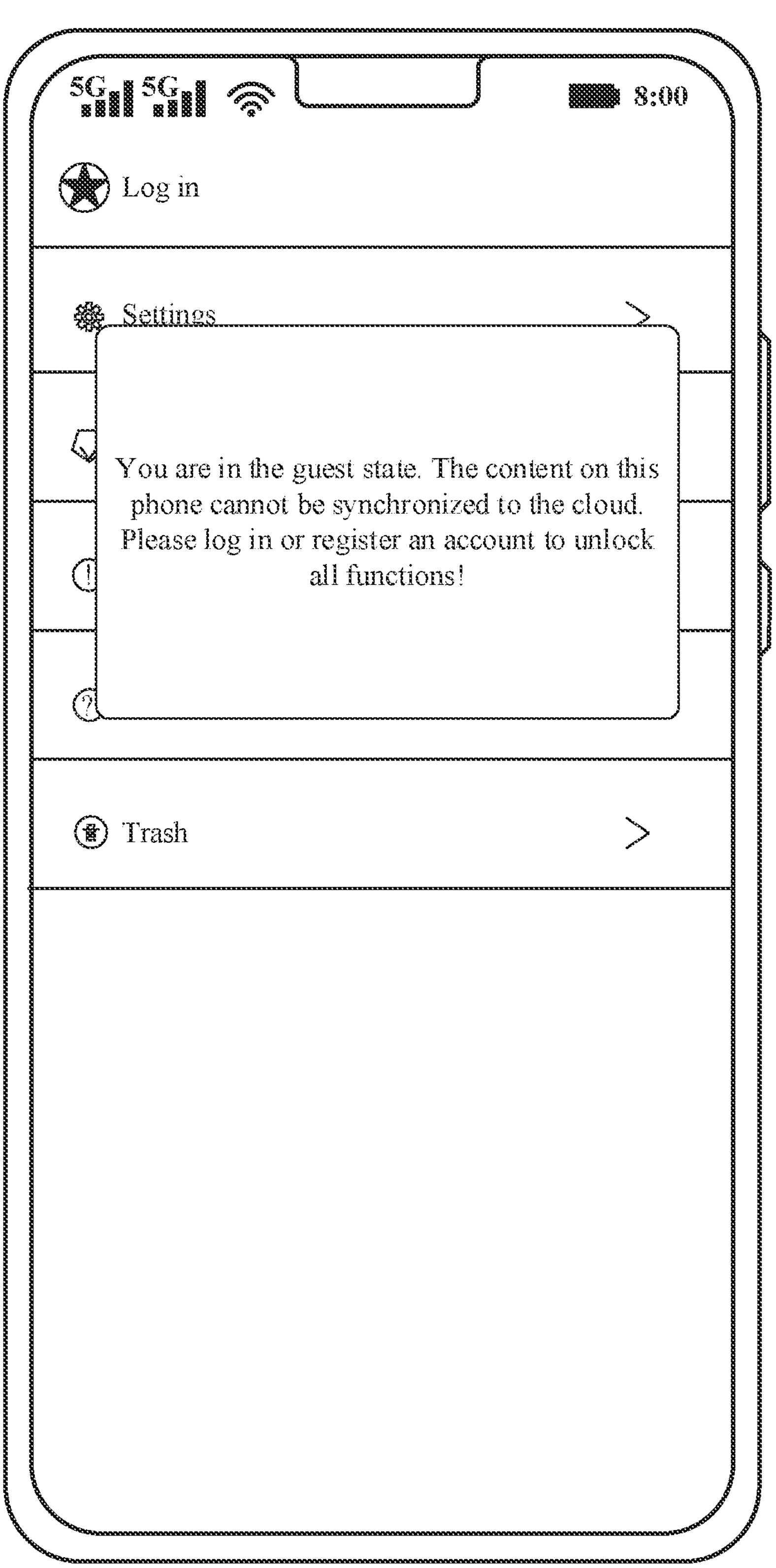
FIG. 8*g* is a schematic diagram of a use interface of a Jnotes application.

The first login authentication response includes information, for example, "login authentication succeeds" or "login success". In this case, the P30pro enters a use interface of the Jnotes application. FIG. 8*e* is a schematic diagram of the use interface of the Jnotes application. As shown in FIG. 8*e*, after the login authentication succeeds, and the use interface is displayed on the Jnotes application, it indicates that the user successfully logs in to the application. The first login authentication response includes information, for example, "login authentication fails" or "login failed". In a possible case, the P30pro exits the Jnotes application and switches to the home screen, as shown in FIG. 8*a*. Another possible scenario is that the P30pro does not exit the Jnotes application, but a pop-up window is displayed on the login page of the Jnotes application to prompt the user that "HUAWEI account login failed. Please try again or select another login method", as shown in FIG. 8*f*. Another possible scenario is that the P30pro enters the use interface of the Jnotes application, but a pop-up window is displayed on the interface, to prompt the user that "You are in the guest state. The content on this phone cannot be synchronized to the cloud. Please log in or register an account to unlock all functions", as shown in FIG. 8*g*. It should be understood that, after the login authentication of the Jnotes application fails, the user may be further prompted in another manner, or a few services may be provided for the user in a permission limiting manner. This is not specifically limited.

It should be noted that FIG. 8*a* to FIG. 8*g* are merely examples of this embodiment of this application, and describe an implementation of the cross-device authentication method provided in this embodiment of this application. However, the method in this embodiment of this application is not limited to the foregoing scenario, including a quantity and a type of devices in the trusted network, a to-be-authenticated application and an authentication application, a login authentication initiation device and a login authentication device, and the like, which are not specifically limited.

FIG. 8*a* to FIG. 8*g* show implementation steps of the cross-device authentication method according to an embodiment of this application by using the "Huawei account application" as the authentication application and logging in to the to-be-authenticated application through Huawei account cross-device authentication. For an electronic device delivered by Huawei, the Huawei account application is an application built in the electronic device. This conforms to the application scenario of the method embodiment shown in FIG. 6. The cross-device authentication method provided in this embodiment of this application may also be applicable to an application scenario of the method embodiment shown in FIG. 7. For example, the WeChat application performs login authentication on an iHuman Chinese application, and authorizes the WeChat account to the iHuman Chinese application for login. For another example, the QQ application performs login authentication on a Tencent music application, and authorizes the WeChat account to the King of Honor application for login.

Figure 9:
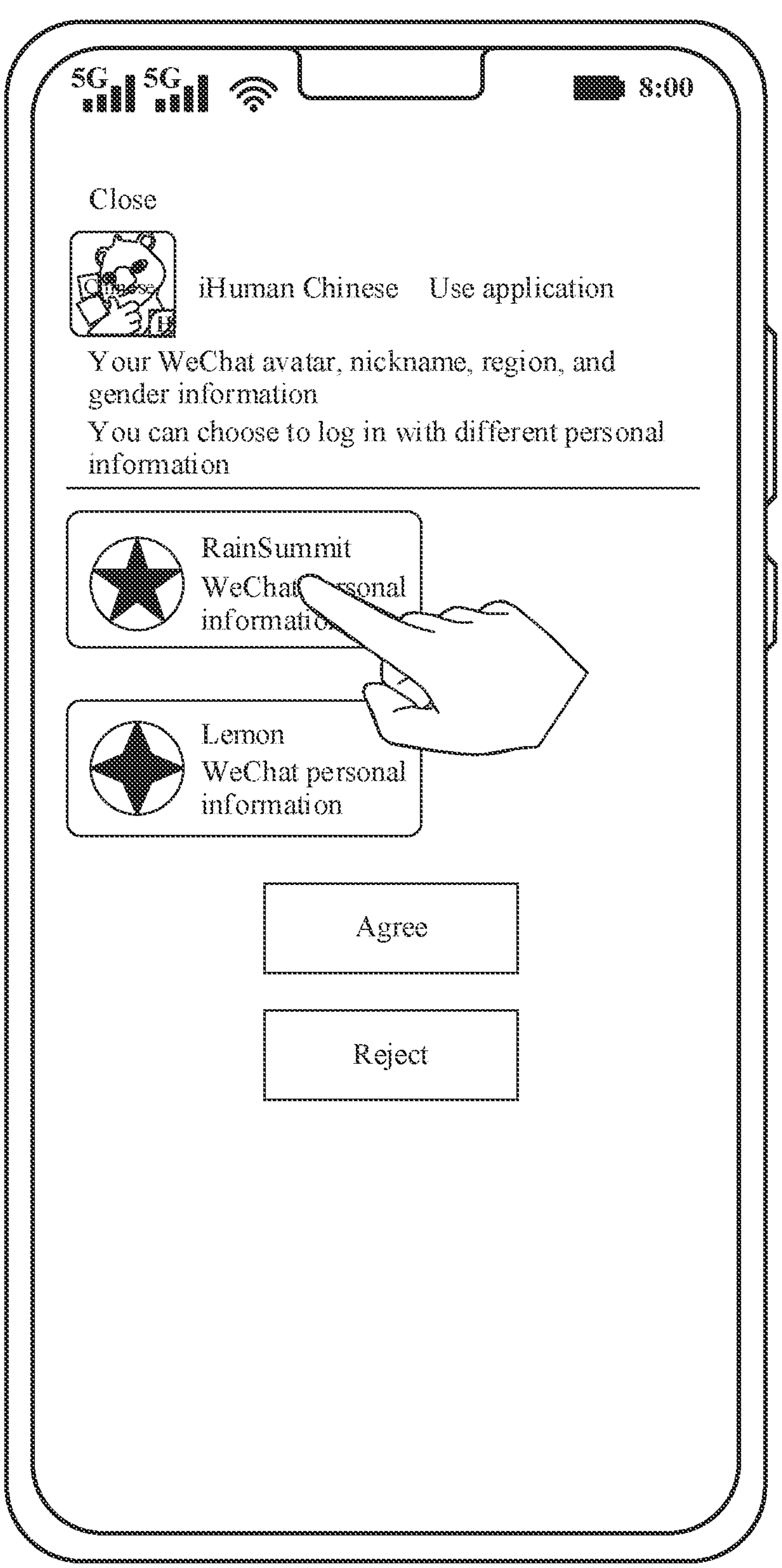
FIG. 9 is a schematic diagram of an account login interface.

In a possible implementation, FIG. 9 is a schematic diagram of an account login interface. As shown in FIG. 9, in this embodiment of this application, the to-be-authenticated application is an iHuman Chinese application installed on a MatePad Pro, and the authentication application is a WeChat application installed on a P30pro. The P30pro uses WeChat twins, so that there are two WeChat accounts (RainSummit and Lemon).

After receiving a first login authentication request, the P30pro pops up a WeChat account login interface on the screen, where the login interface includes an icon and a name of the iHuman Chinese application, a text description of application information, buttons of two WeChat accounts (RainSummit and Lemon), and "Agree" and "Reject" buttons. The user can tap one of the two WeChat accounts as the WeChat account to be authorized to the iHuman Chinese application, for example, the WeChat account RainSummit. Then, when the user taps the "Agree" button, it indicates that the user agrees to authorize the WeChat account RainSummit to the iHuman Chinese application. In this case, the iHuman Chinese application can use the WeChat account RainSummit to log in. When the user taps the "Reject" button, it indicates that the user does not agree to authorize the WeChat account to the iHuman Chinese application. In this case, the iHuman Chinese application cannot use the WeChat account to log in.

It should be understood that, to implement the foregoing functions, the electronic device includes corresponding hardware and/or software modules for performing the functions. With reference to the example algorithm steps described in the embodiments disclosed in this specification, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in this embodiment, division into the modules is an example, is merely logical function division, and may be other division during actual implementation.

Figure 10:
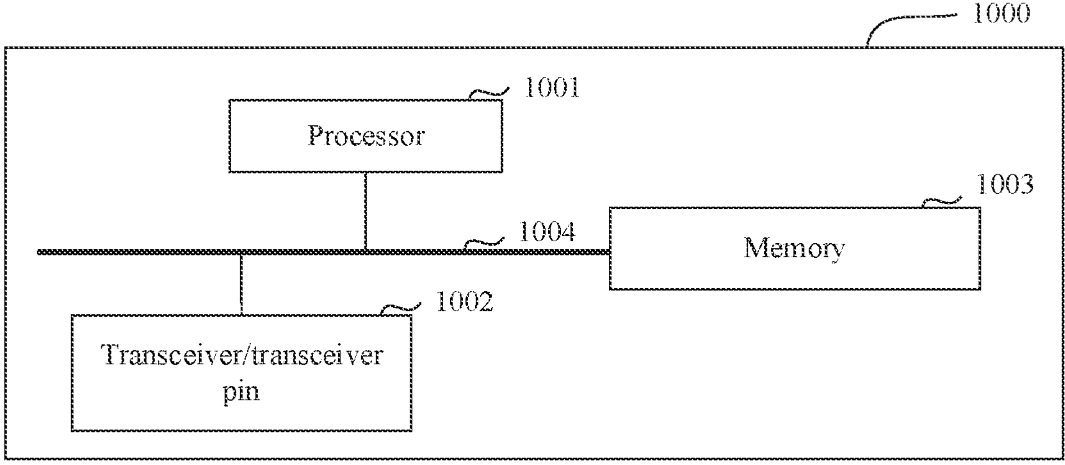
FIG. 10 is a schematic block diagram of an apparatus 1000 according to an embodiment of this application.

In an example. FIG. 10 is a schematic block diagram of an apparatus 1000 according to an embodiment of this application. As shown in FIG. 10, the apparatus 1000 may include a processor 1001 and a transceiver/transceiver pin 1002, and optionally, further includes a memory 1003.

Components of the apparatus 1000 are coupled together by using the bus 1004. In addition to a data bus, the bus 1004 further includes a power bus, a control bus, and a status signal bus. However, for clear description, various buses are referred to as the bus 1004 in the figure.

Optionally, the memory 1003 may be used for instructions in the foregoing method embodiments. The processor 1001 may be configured to: execute instructions in the memory 1003, control a receive pin to receive a signal, and control a transmit pin to send a signal.

The apparatus 1000 may be the electronic device or a chip of the electronic device in the foregoing method embodiments.

All related content of the steps in the foregoing method embodiments may be cited in function descriptions of the corresponding functional modules. Details are not described herein again.

An embodiment further provides a computer-storage medium. The computer-storage medium stores computer instructions. When the computer instructions are run on an electronic device, the electronic device is enabled to perform the related method steps, to implement the cross-device authentication method in the foregoing embodiment.

An embodiment further provides a computer program product. When the computer program product is run on a computer, the computer is enabled to perform the related steps, to implement the cross-device authentication method in the foregoing embodiment.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the cross-device authentication method in the foregoing method embodiments.

The electronic device, the computer storage medium, the computer program product, or the chip provided in embodiments are all configured to perform the corresponding method provided above. Therefore, for beneficial effects that can be achieved, refer to the beneficial effects of the corresponding method provided above. Details are not described herein again.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above.

In several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

Any content of embodiments of this application and any content of a same embodiment may be freely combined. Any combination of the foregoing content shall fall within the scope of this embodiment of this application.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The storage medium includes various media that can store program code, such as a USB flash drive, a removable hard disk, a read-only memory (read-only memory, ROM), a random access memory (random access memory, RAM), a magnetic disk, or an optical disc.

The foregoing describes the embodiments of this application with reference to the accompanying drawings. However, the embodiments of this application are not limited to the foregoing specific implementations. The foregoing specific implementations are merely examples instead of limiting. A person of ordinary skill in the art, under the teachings of the embodiments of this application, may further make many modifications without departing from the purpose of the embodiments of this application and the protection scope of the claims, and all of the modifications fall within the protection of the embodiments of this application.

What is claimed is:

1. A method comprising:

determining a login authentication device of a to-be-authenticated application by:

sending a query request to one or more electronic devices to enable the one or more electronic devices to separately determine whether the one or more electronic devices have an account authorization capability of an authentication application, wherein the query request comprises first identification information and account login indication information;

receiving, from at least one electronic device having the account authorization capability in the one or more electronic devices, a query response comprising a device identifier of the at least one electronic device;

determining a unique electronic device as the login authentication device in response to the at least one electronic device comprises only the unique electronic device; and in response to the at least one electronic device comprising multiple electronic devices:

displaying the multiple electronic devices on a screen for selection by a user;

receiving a selection from the user; and determining, from among the multiple electronic devices and in response to the selection, a selected electronic device as the login authentication device;

sending, to the login authentication device, a first login authentication request comprising the account login indication information and the first identification information of the authentication application; and obtaining, from the login authentication device, a first login authentication response comprising indication information of a login authentication result that is based on the account login indication information and the first identification information.

2. The method of claim 1, wherein determining the login authentication device further comprises identifying a trusted network comprising electronic devices that have a trusted relationship, wherein the trusted network comprises the one or more electronic devices.

3. The method of claim 1, further comprising receiving, from a login authentication platform, the first login authentication response, and wherein the first login authentication response is based on a second login authentication response from the login authentication device to the login authentication platform.

4. The method of claim 1, wherein before determining the login authentication device, the method further comprises:

sending, to a login authentication platform, a second login authentication request comprising second identification information of the to-be-authenticated application; and receiving, from the login authentication platform, a second login authentication response comprising the first identification information and the account login indication information.

5. The method of claim 1, wherein after obtaining the first login authentication response, the method further comprises:

entering a user interface of the to-be-authenticated application in response to the indication information indicating that login authentication has succeeded; and exiting the to-be-authenticated application in response to the indication information indicating that the login authentication has failed.

6. The method of claim 1, wherein after obtaining the first login authentication response, the method further comprises:

entering a user interface of the to-be-authenticated application in response to the indication information indicating that login authentication has succeeded; and popping up a window indicating that the login authentication has failed in response to the indication information indicating that the login authentication has failed.

7. A method applied to a device and comprising:

receiving, from a login authentication initiation device, a first login authentication request comprising identification information of an authentication application and account login indication information;

determining, in response to first login authentication request and based on the authentication application being installed and accessed on the device, that the device has account authorization capability of the authentication application;

displaying, based on the account authorization capability, an account login interface of the authentication application, wherein the account login interface comprises a first button indicating to approve authorization and a second button indicating to reject the authorization;

obtaining an operation instruction that is based on a tapping operation of a user on the first button or the second button, wherein the operation instruction comprises a login authentication result; and feeding back, to the login authentication initiation device, a first login authentication response comprising indication information of the login authentication result.

8. The method of claim 7, wherein before receiving the first login authentication request, the method further comprises:

receiving, from the login authentication initiation device, a query request comprising the identification information and the account login indication information; and sending, to the login authentication initiation device, a query response comprising a device identifier in response to the login authentication initiation device having the account authorization capability.

9. The method of claim 7, wherein feeding back the first login authentication response comprises sending, to a login authentication platform, a second login authentication response to enable the login authentication platform to send, based on the second login authentication response, the first login authentication response to the login authentication initiation device.

10. The method of claim 7, wherein the authentication application is accessed on the device when the authentication application is logged in.

11. A device comprising:

a memory configured to store instructions; and one or more processors coupled to the memory and configured to execute the instructions to cause the device to:

determine a login authentication device of a to-be-authenticated application, wherein the login authentication device comprises an authentication application, and wherein the authentication application is logged in, wherein the one or more processors are further configured to execute the instructions to cause the device to further determine the login authentication device by:

sending a query request to one or more electronic devices to enable the one or more electronic devices to separately determine whether the one or more electronic devices have an account authorization capability of the authentication application, wherein the query request comprises first identification information and account login indication information;

receiving, from at least one electronic device having the account authorization capability in the one or more electronic devices, a query response comprising a device identifier of the at least one electronic device;

determining a unique electronic device as the login authentication device in response to the at least one electronic device comprises the unique electronic device; and in response to the at least one electronic device comprises multiple electronic devices:

displaying the multiple electronic devices on a screen for selection by a user; and determining an electronic device selected by the user as the login authentication device;

send, to the login authentication device, a first login authentication request comprising the account login indication information and the first identification information; and obtain, from the login authentication device, a first login authentication response comprising indication information of a login authentication result that is based on the account login indication information and the first identification information.

12. The device of claim 11, wherein the one or more processors are further configured to execute the instructions to cause the device to further determine the login authentication device by identifying a trusted network comprising at least two electronic devices that have a trusted relationship, wherein the trusted network comprises the one or more electronic devices.

13. The device of claim 11, wherein the one or more processors are further configured to execute the instructions to cause the device to receive, from a login authentication platform, the first login authentication response, wherein the first login authentication response is based on a second login authentication response received by the login authentication platform from the login authentication device.

14. The device of claim 11, wherein the one or more processors are further configured to execute the instructions to cause the device to:

send, to a login authentication platform, a second login authentication request comprising second identification information of the to-be-authenticated application; and receive, from the login authentication platform, a second login authentication response comprising the first identification information and the account login indication information.

15. The device of claim 11, wherein the one or more processors are further configured to execute the instructions to cause the device to:

enter a user interface of the to-be-authenticated application when the indication information indicates that login authentication has succeeded; and exit the to-be-authenticated application when the indication information indicates that the login authentication has failed.

16. The device of claim 11, wherein the one or more processors are further configured to execute the instructions to cause the device to:

enter a user interface of the to-be-authenticated application when the indication information indicates that login authentication has succeeded; and pop up a window indicating that the login authentication has failed when the indication information indicates that the login authentication has failed.

17. A device comprising:

a memory configured to store instructions; and one or more processors coupled to the memory and configured to execute the instructions to cause the device to:

receive, from a login authentication initiation device, a first login authentication request comprising identification information of an authentication application and account login indication information;

determine, in response to first login authentication request and based on the authentication application being installed and accessed on the device, that the device has account authorization capability of the authentication application;

display, based on the first login authentication request and the account authorization capability, an account login interface of the authentication application, wherein the account login interface comprises a first button indicating to approve authorization and a second button indicating to reject the authorization;

obtain an operation instruction generated when a user performs a tapping operation on the first button or the second button, wherein the operation instruction comprises a login authentication result; and feed back, to the login authentication initiation device, a first login authentication response comprising indication information of the login authentication result that is based on the account login indication information and the identification information.

18. The device of claim 17, wherein the one or more processors are further configured to execute the instructions to cause the device to:

receive, from the login authentication initiation device, a query request comprising the identification information and the account login indication information; and send, to the login authentication initiation device, a query response comprising a device identifier when the device has the account authorization capability.

19. The device of claim 17, wherein the one or more processors are further configured to execute the instructions to cause the device to send, to a login authentication platform, a second login authentication response to enable the login authentication platform to send, based on the second login authentication response, the first login authentication response to the login authentication initiation device, and wherein the login authentication platform is configured to provide a login authentication service of the authentication application.

20. The device of claim 17, wherein the authentication application is accessed on the device when the authentication application is logged in.

* * * * *